US011405507B2

(12) United States Patent
Forstall et al.

(10) Patent No.: US 11,405,507 B2
(45) Date of Patent: *Aug. 2, 2022

(54) PORTABLE MULTIFUNCTION DEVICE, METHOD, AND GRAPHICAL USER INTERFACE FOR CONFERENCE CALLING

(71) Applicant: Apple Inc., Cupertino, CA (US)

(72) Inventors: Scott Forstall, Los Altos, CA (US); Imran Chaudhri, San Francisco, CA (US); Michael Matas, Healdsburg, CA (US); Marcel Van Os, San Francisco, CA (US); Stephen O. Lemay, Palo Alto, CA (US); Patrick Lee Coffman, San Francisco, CA (US); Elizabeth Caroline Furches Cranfill, San Francisco, CA (US); Greg Christie, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/306,236

(22) Filed: May 3, 2021

(65) Prior Publication Data

US 2021/0321003 A1 Oct. 14, 2021

Related U.S. Application Data

(63) Continuation of application No. 16/434,794, filed on Jun. 7, 2019, now Pat. No. 10,999,442, which is a
(Continued)

(51) Int. Cl.
*H04M 3/56* (2006.01)
*G06F 3/0488* (2022.01)
(Continued)

(52) U.S. Cl.
CPC ............ *H04M 3/56* (2013.01); *G06F 3/0482* (2013.01); *G06F 3/0488* (2013.01);
(Continued)

(58) Field of Classification Search
CPC . H04M 3/56; H04M 1/27475; G06F 3/04817; G06F 3/0482; G06F 3/04842; G06F 3/0488; G06F 3/04883
See application file for complete search history.

(56) References Cited

U.S. PATENT DOCUMENTS 4,686,332 A 8/1987 Greanias et al.
5,619,555 A 4/1997 Fenton et al.
(Continued)

FOREIGN PATENT DOCUMENTS

CN 1444380 A 9/2003
DE 19983569 T1 10/2001
(Continued)

OTHER PUBLICATIONS

*Apple Inc.* vs. *Samsung Electronics Co. Ltd. et al.*, Judgment in Interlocutory proceeding, Case No. 396957/KG ZA 11-730, civil law sector, Aug. 24, 2011, pp. 1-65.
(Continued)

*Primary Examiner* — Cao H Nguyen
(74) *Attorney, Agent, or Firm* — Dentons US LLP

(57) ABSTRACT

The present disclosure generally relates to managing phone calls. In some embodiments, an electronic device with a touch screen displays a phone call user interface which includes informational items associated with phone calls as well as other affordances. In some embodiments, the electronic device displays an incoming call user interface that includes selectable options that, when selected via user input, display different user interfaces.

24 Claims, 30 Drawing Sheets

Related U.S. Application Data continuation of application No. 15/620,662, filed on Jun. 12, 2017, now Pat. No. 10,320,987, which is a continuation of application No. 15/137,127, filed on Apr. 25, 2016, now Pat. No. 9,706,054, which is a continuation of application No. 14/632,817, filed on Feb. 26, 2015, now Pat. No. 9,325,852, which is a continuation of application No. 13/176,703, filed on Jul. 5, 2011, now Pat. No. 8,972,904, which is a continuation of application No. 11/960,673, filed on Dec. 19, 2007, now Pat. No. 7,975,242.

(60) Provisional application No. 60/937,993, filed on Jun. 29, 2007, provisional application No. 60/947,133, filed on Jun. 29, 2007, provisional application No. 60/879,469, filed on Jan. 8, 2007, provisional application No. 60/879,253, filed on Jan. 7, 2007.

(51) Int. Cl.
| | | |
|---|---|---|
| *H04M 1/57* | (2006.01) | |
| *H04M 1/7243* | (2021.01) | |
| *H04M 1/72436* | (2021.01) | |
| *G06F 3/04817* | (2022.01) | |
| *G06F 3/0482* | (2013.01) | |
| *G06F 3/04842* | (2022.01) | |
| *H04M 3/42* | (2006.01) | |
| *G06F 3/04883* | (2022.01) | |
| *H04M 1/60* | (2006.01) | |
| *H04M 1/663* | (2006.01) | |
| *H04M 1/72442* | (2021.01) | |
| *H04M 1/27475* | (2020.01) | |
| *H04M 1/72466* | (2021.01) | |
| *H04M 1/72469* | (2021.01) | |
| *H04M 1/72403* | (2021.01) | |

(52) U.S. Cl.
CPC ...... *G06F 3/04817* (2013.01); *G06F 3/04842* (2013.01); *G06F 3/04883* (2013.01); *H04M 1/27475* (2020.01); *H04M 1/576* (2013.01); *H04M 1/7243* (2021.01); *H04M 1/72403* (2021.01); *H04M 1/72436* (2021.01); *H04M 1/72466* (2021.01); *H04M 1/72469* (2021.01); *H04M 3/42059* (2013.01); *H04M 3/564* (2013.01); *H04M 1/6008* (2013.01); *H04M 1/6041* (2013.01); *H04M 1/663* (2013.01); *H04M 1/72442* (2021.01); *H04M 2250/12* (2013.01); *H04M 2250/22* (2013.01); *H04M 2250/62* (2013.01)

(56) References Cited

U.S. PATENT DOCUMENTS

| | | | |
|---|---|---|---|
| 5,627,567 | A | 5/1997 | Davidson |
| 5,627,978 | A | 5/1997 | Altom et al. |
| 5,633,912 | A | 5/1997 | Tsoi |
| 5,644,628 | A | 7/1997 | Schwarzer et al. |
| 5,701,340 | A | 12/1997 | Zwick |
| 5,867,150 | A | 2/1999 | Bricklin et al. |
| 6,026,158 | A | 2/2000 | Bayless et al. |
| 6,047,054 | A | 4/2000 | Bayless et al. |
| 6,070,068 | A | 5/2000 | Sudo |
| 6,088,696 | A | 7/2000 | Moon et al. |
| 6,094,197 | A | 7/2000 | Buxton et al. |
| 6,236,854 | B1 | 5/2001 | Bradshaw, Jr. |
| 6,259,436 | B1 | 7/2001 | Moon et al. |
| 6,269,159 | B1 | 7/2001 | Cannon et al. |
| 6,298,045 | B1 | 10/2001 | Pang et al. |
| 6,323,846 | B1 | 11/2001 | Westerman et al. |
| 6,392,999 | B1 | 5/2002 | Liu et al. |
| 6,396,531 | B1 | 5/2002 | Gerszberg et al. |
| 6,424,711 | B1 * | 7/2002 | Bayless ............... H04M 1/575 379/355.09 |
| 6,430,284 | B1 | 8/2002 | Jones |
| 6,430,405 | B1 | 8/2002 | Jambhekar et al. |
| 6,448,988 | B1 | 9/2002 | Haitani et al. |
| 6,505,040 | B1 | 1/2003 | Kim |
| 6,516,202 | B1 | 2/2003 | Hawkins et al. |
| 6,526,274 | B1 | 2/2003 | Fickes et al. |
| 6,535,730 | B1 | 3/2003 | Chow et al. |
| 6,542,591 | B1 | 4/2003 | Amro et al. |
| 6,549,612 | B2 | 4/2003 | Gifford et al. |
| 6,570,557 | B1 | 5/2003 | Westerman et al. |
| 6,577,721 | B1 | 6/2003 | Vainio et al. |
| 6,583,806 | B2 | 6/2003 | Ludwig et al. |
| 6,593,949 | B1 | 7/2003 | Chew et al. |
| 6,677,932 | B1 | 1/2004 | Westerman |
| 6,738,461 | B2 | 5/2004 | Trandal et al. |
| 6,763,388 | B1 | 7/2004 | Tsimelzon |
| 6,768,722 | B1 | 7/2004 | Katseff et al. |
| 6,772,188 | B1 | 8/2004 | Cloutier |
| 6,792,082 | B1 | 9/2004 | Levine |
| 6,839,417 | B2 | 1/2005 | Weisman et al. |
| 6,879,691 | B1 | 4/2005 | Koretz |
| 6,961,420 | B2 | 11/2005 | Desalvo |
| 7,007,239 | B1 | 2/2006 | Hawkins et al. |
| 7,031,728 | B2 | 4/2006 | Beyer, Jr. |
| 7,046,230 | B2 | 5/2006 | Zadesky et al. |
| 7,050,557 | B2 | 5/2006 | Creamer et al. |
| 7,117,445 | B2 | 10/2006 | Berger |
| 7,184,428 | B1 | 2/2007 | Gerszberg et al. |
| 7,185,058 | B2 | 2/2007 | Blackwell et al. |
| 7,212,808 | B2 | 5/2007 | Engstrom et al. |
| 7,221,748 | B1 | 5/2007 | Moore et al. |
| 7,225,409 | B1 | 5/2007 | Schnarel et al. |
| 7,231,208 | B2 | 6/2007 | Robertson et al. |
| 7,231,229 | B1 | 6/2007 | Hawkins et al. |
| 7,251,479 | B2 | 7/2007 | Holder et al. |
| 7,280,652 | B2 | 10/2007 | Booking et al. |
| 7,280,850 | B2 | 10/2007 | Hama et al. |
| 7,289,614 | B1 | 10/2007 | Twerdahl et al. |
| 7,295,852 | B1 | 11/2007 | Davis et al. |
| 7,403,767 | B2 | 7/2008 | Kashanian et al. |
| 7,409,050 | B1 | 8/2008 | Li et al. |
| 7,479,949 | B2 | 1/2009 | Jobs et al. |
| 7,493,567 | B2 | 2/2009 | Ollis et al. |
| 7,495,659 | B2 | 2/2009 | Marriott et al. |
| 7,499,040 | B2 | 3/2009 | Zadesky et al. |
| 7,502,633 | B2 | 3/2009 | Engstrom et al. |
| 7,509,588 | B2 | 3/2009 | Van Os et al. |
| 7,526,306 | B2 | 4/2009 | Brems et al. |
| 7,606,598 | B2 | 10/2009 | Kuhl et al. |
| 7,614,008 | B2 | 11/2009 | Ording |
| 7,623,643 | B2 | 11/2009 | Raghav et al. |
| 7,650,137 | B2 | 1/2010 | Jobs et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,664,485 | B2 | 2/2010 | Twerdahl et al. |
| 7,680,513 | B2 | 3/2010 | Haitani et al. |
| 7,685,530 | B2 | 3/2010 | Sherrard et al. |
| 7,694,231 | B2 | 4/2010 | Kocienda et al. |
| 7,715,535 | B2 | 5/2010 | Vander Veen et al. |
| 7,720,218 | B2 | 5/2010 | Abramson et al. |
| 7,724,887 | B2 | 5/2010 | Jennings et al. |
| 7,778,399 | B2 | 8/2010 | Ambrose |
| 7,778,671 | B2 | 8/2010 | Roykkee et al. |
| 7,779,630 | B2 | 8/2010 | Sakamoto |
| 7,783,283 | B2 | 8/2010 | Kuusinen et al. |
| 7,808,479 | B1 | 10/2010 | Hotelling et al. |
| 7,812,817 | B2 * | 10/2010 | Robertson ............. H04M 1/724 345/156 |
| 7,839,987 | B1 | 11/2010 | Kirchhoff et al. |
| 7,844,914 | B2 | 11/2010 | Andre et al. |
| 7,894,597 | B2 | 2/2011 | Walker et al. |
| 7,920,886 | B1 | 4/2011 | Lai et al. |
| 7,975,242 | B2 | 7/2011 | Forstall et al. |
| 7,991,432 | B2 | 8/2011 | Silverbrook et al. |
| 8,001,120 | B2 | 8/2011 | Todd et al. |

(56) References Cited

U.S. PATENT DOCUMENTS

| | | |
|---|---|---|
| 8,014,760 B2 | 9/2011 | Forstall et al. |
| 8,019,388 B2 | 9/2011 | Chiam et al. |
| 8,064,886 B2 | 11/2011 | Hawkins et al. |
| 8,090,087 B2 | 1/2012 | Jobs et al. |
| 8,095,879 B2 | 1/2012 | Goertz |
| 8,126,120 B2 | 2/2012 | Ward et al. |
| 8,135,389 B2 | 3/2012 | Forstall et al. |
| 8,175,656 B2 | 5/2012 | Beith |
| 8,255,003 B2 | 8/2012 | Forstall et al. |
| 8,255,033 B2 | 8/2012 | Petisce et al. |
| 8,452,342 B2 | 5/2013 | Forstall et al. |
| 8,972,904 B2 | 3/2015 | Forstall et al. |
| 9,325,852 B2 | 4/2016 | Forstall et al. |
| 9,706,054 B2 | 7/2017 | Forstall et al. |
| 10,320,987 B2 | 6/2019 | Forstall et al. |
| 2001/0049283 A1 | 12/2001 | Thomas |
| 2002/0015024 A1 | 2/2002 | Westerman et al. |
| 2002/0045438 A1 | 4/2002 | Tagawa et al. |
| 2002/0073207 A1 | 6/2002 | Widger et al. |
| 2002/0076015 A1 | 6/2002 | Norwitz et al. |
| 2002/0077158 A1 | 6/2002 | Scott |
| 2002/0084991 A1 | 7/2002 | Harrison et al. |
| 2002/0093531 A1 | 7/2002 | Barile |
| 2002/0111991 A1 | 8/2002 | Wood et al. |
| 2002/0116464 A1 | 8/2002 | Mak |
| 2002/0128036 A1 | 9/2002 | Yach et al. |
| 2003/0073430 A1 | 4/2003 | Robertson et al. |
| 2003/0138080 A1 | 7/2003 | Nelson et al. |
| 2003/0142138 A1 | 7/2003 | Brown et al. |
| 2003/0142200 A1 | 7/2003 | Canova, Jr. et al. |
| 2003/0198329 A1 | 10/2003 | Mcgee |
| 2004/0047461 A1 | 3/2004 | Weisman et al. |
| 2004/0137955 A1 | 7/2004 | Engstrom et al. |
| 2004/0203674 A1 | 10/2004 | Shi et al. |
| 2004/0235520 A1 | 11/2004 | Cadiz et al. |
| 2004/0267887 A1 | 12/2004 | Berger et al. |
| 2005/0015495 A1 | 1/2005 | Florkey et al. |
| 2005/0032527 A1 | 2/2005 | Sheha et al. |
| 2005/0047562 A1 | 3/2005 | Holz et al. |
| 2005/0048958 A1 | 3/2005 | Mousseau et al. |
| 2005/0052427 A1 | 3/2005 | Wu et al. |
| 2005/0074107 A1 | 4/2005 | Renner et al. |
| 2005/0074109 A1 | 4/2005 | Hanson et al. |
| 2005/0078613 A1 | 4/2005 | Covell et al. |
| 2005/0085274 A1 | 4/2005 | Lee et al. |
| 2005/0094792 A1 | 5/2005 | Berthoud et al. |
| 2005/0101308 A1 | 5/2005 | Lee |
| 2005/0123116 A1 | 6/2005 | Gau |
| 2005/0141686 A1 | 6/2005 | Matsunaga et al. |
| 2005/0157174 A1 | 7/2005 | Kitamura et al. |
| 2005/0182798 A1 | 8/2005 | Todd et al. |
| 2005/0250483 A1 | 11/2005 | Malik |
| 2005/0286693 A1 | 12/2005 | Brown et al. |
| 2006/0002536 A1 | 1/2006 | Ambrose |
| 2006/0010395 A1 | 1/2006 | Aaltonen |
| 2006/0015819 A1 | 1/2006 | Hawkins et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0030369 A1 | 2/2006 | Yang |
| 2006/0033724 A1 | 2/2006 | Chaudhri et al. |
| 2006/0035632 A1 | 2/2006 | Sorvari et al. |
| 2006/0063539 A1 | 3/2006 | Beyer |
| 2006/0121925 A1 | 6/2006 | Jung |
| 2006/0121939 A1 | 6/2006 | Anwar et al. |
| 2006/0132595 A1 | 6/2006 | Kenoyer et al. |
| 2006/0135197 A1 | 6/2006 | Jin et al. |
| 2006/0140189 A1 | 6/2006 | Wu et al. |
| 2006/0154658 A1 | 7/2006 | Holder et al. |
| 2006/0161870 A1 | 7/2006 | Hotelling et al. |
| 2006/0168539 A1 | 7/2006 | Hawkins et al. |
| 2006/0178137 A1 | 8/2006 | Loveland |
| 2006/0181517 A1 | 8/2006 | Zadesky et al. |
| 2006/0190833 A1 | 8/2006 | Sangiovanni et al. |
| 2006/0197753 A1 | 9/2006 | Hotelling |
| 2006/0199612 A1 | 9/2006 | Beyer et al. |
| 2006/0205432 A1 | 9/2006 | Hawkins et al. |
| 2006/0222168 A1 | 10/2006 | Curley et al. |
| 2006/0229107 A1 | 10/2006 | Cho et al. |
| 2006/0264205 A1 | 11/2006 | Gibbs |
| 2006/0274051 A1 | 12/2006 | Longe et al. |
| 2006/0281449 A1 | 12/2006 | Kun et al. |
| 2007/0071186 A1 | 3/2007 | Sahasrabudhe et al. |
| 2007/0082697 A1 | 4/2007 | Bumiller et al. |
| 2007/0083600 A1 | 4/2007 | Bakos et al. |
| 2007/0091830 A1 | 4/2007 | Coulas et al. |
| 2007/0092072 A1 | 4/2007 | Jacobs |
| 2007/0111743 A1 | 5/2007 | Leigh et al. |
| 2007/0115919 A1 | 5/2007 | Chahal et al. |
| 2007/0116226 A1 | 5/2007 | Bennett et al. |
| 2007/0117508 A1 | 5/2007 | Jachner |
| 2007/0123239 A1 | 5/2007 | Leigh et al. |
| 2007/0123320 A1 | 5/2007 | Han et al. |
| 2007/0133771 A1 | 6/2007 | Stifelman et al. |
| 2007/0149188 A1 | 6/2007 | Miyashita et al. |
| 2007/0150830 A1 | 6/2007 | Ording et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0243858 A1 | 10/2007 | Marathe et al. |
| 2007/0257890 A1 | 11/2007 | Hotelling et al. |
| 2007/0280457 A1 | 12/2007 | Aberethy et al. |
| 2008/0055263 A1 | 3/2008 | Lemay et al. |
| 2008/0168361 A1 | 7/2008 | Forstall et al. |
| 2008/0168384 A1 | 7/2008 | Platzer et al. |
| 2008/0295017 A1 | 11/2008 | Tseng et al. |
| 2009/0280868 A1 | 11/2009 | Hawkins et al. |
| 2010/0273466 A1 | 10/2010 | Robertson et al. |
| 2010/0283743 A1 | 11/2010 | Coddington |
| 2014/0011485 A1 | 1/2014 | Forstall et al. |
| 2017/0085716 A1 | 3/2017 | Forstall et al. |
| 2017/0279967 A1 | 9/2017 | Forstall et al. |
| 2019/0394336 A1 | 12/2019 | Forstall et al. |

FOREIGN PATENT DOCUMENTS

| | | |
|---|---|---|
| EP | 0804009 A2 | 10/1997 |
| EP | 0859498 A2 | 8/1998 |
| EP | 1069791 A1 | 1/2001 |
| EP | 1365564 A1 | 11/2003 |
| EP | 1621983 A2 | 2/2006 |
| EP | 1635543 A1 | 3/2006 |
| EP | 1763243 A2 | 3/2007 |
| GB | 2338141 A | 12/1999 |
| WO | 1997/08879 A2 | 3/1997 |
| WO | 1998/30002 A2 | 7/1998 |
| WO | 1998/48551 A2 | 10/1998 |
| WO | 1999/16181 A1 | 4/1999 |
| WO | 2000/16186 A2 | 3/2000 |
| WO | 2000/38042 A1 | 6/2000 |
| WO | 2002/32088 A2 | 4/2002 |
| WO | 2003/060622 A2 | 7/2003 |
| WO | 2004/031902 A2 | 4/2004 |
| WO | 2005/010738 A2 | 2/2005 |
| WO | 2005/025081 A1 | 3/2005 |
| WO | 2005/053279 A1 | 6/2005 |
| WO | 2006/070228 A2 | 7/2006 |
| WO | 2006/134473 A2 | 12/2006 |

OTHER PUBLICATIONS

Advisory Action received for U.S. Appl. No. 11/769,694, dated Feb. 23, 2011, 3 pages.

Agilent Technologies Inc., "Agilent Unveils Optical Proximity Sensor for Mobile Appliances", available at <http:/www.embeddedstar.com/press/content/2004/8/embedded16015.html>, Aug. 31, 2004, 2 pages.

Alejandre Suzanne, "Graphing Linear Equations", Available at <http://mathforum.org/alejandre/palm/times.palm.html>, retrieved on Jun. 12, 2006, 2006, 3 pages.

Alltel, "My Account", http://alltel.com/personal/cs/my_account.html, Dec. 1, 2005, 1 page.

(56) References Cited

OTHER PUBLICATIONS

Andrew's Widgets, "Developing Dashboard Widgets—A Brief Introduction to Building Widgets for Apple's Dashboard Environment", Available online at <http://andrew.hedges.name/widgets/dev/>, Retrieved on Mar. 13, 2015, 6 pages.

Aoki et al., "Tap Tips: Lightweight Discovery of Touchscreen Targets", Xerox Palo Alto Research Center, Jan. 2001, 2 pages.

*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.

*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.

apple.com, "Tiger Developer Overview Series—Developing Dashboard Widgets", Available online at <http://developer.apple.com/macosx/dashboard.html>, Jun. 26, 2006, 9 pages.

Applicant-Initiated Interview Summary received for U.S. Appl. No. 16/434,794, dated Sep. 11, 2020, 3 pages.

Atis, "Numbering and Dialing Plan within the United States", Copyright © 2008 by Alliance for Telecommunications Industry Solutions, 2008, 17 pages.

Cadiz et al., "Exploring PC-Telephone Convergence with the Enhanced Telephony Prototype", CHI, vol. 6, No. 1, Apr. 24-29, 2004, pp. 215-222.

Certification received for Australian Patent Application No. 2012100821, Jul. 6, 2012, 2 pages.

Chen et al., "A Novel Navigation and Transmission Technique for Mobile Handheld Devices", Technical Report CSE-2003-1, Department of Computer Science, University of California at Davis, 2003, 8 pages.

Chen et al., "Detecting Web Pages Structure for Adaptive Viewing on Small Form Factor Devices", Proceedings of the 12th international conference on World Wide Web, 2003, 9 pages.

Cibenix, "RIS Wireless Company Profile", http://72.14.203.104/search/q=cache:N2vLpIKG3SQJ:ris.com/directo, Nov. 29, 2005, 3 pages.

Cingular, "International Roaming Guide-Personal Experiences(s) from Customer and Community Member", Cingular Customer Forums, printed Jun. 26, 2006, 6 pages.

Corrected Notice of Allowance received for U.S. Appl. No. 16/434,794, dated Feb. 8, 2021, 3 pages.

cross-browser.com, "CrossBrowser.com: Fixed Table Headers", http://web.archive.org/web/20061205082655/http://cross-browser.com/x/examples/fixed_table_headers.html, Dec. 5, 2006, 3 pages.

Day B., "Will Cell Phones Render iPods Obsolete?", available at <http://weblogs.iavanet/pub/wig/883>, Dec. 12, 2005, 3 pages.

Decision to Grant received for European Patent Application No. 07844104.5, dated Oct. 25, 2018, 2 pages.

Decision to Refuse Application, received for the European Patent Application No. 07841759.9, dated Dec. 8, 2011, 3 pages.

DialDTMF, "A Pocket PC (Pocket Contact) plugin to Dial Telephone Numbers Using DTMF's (aka Dual Tone Multi-Frequency)", http://dialdtmf.sourceforge.net, printed Jan. 10, 2009, 9 pages.

Dietz et al., "DiamondTouch: A Multi-User Touch Technology", Proceedings of the 14th Annual ACM Symposium on User Interface Software and Technology, Nov. 11-14, 2001, pp. 219-226.

Education & Training, Help Index, Connecticut Education & Training, printed Dec. 31, 2007, 12 pages.

Electric Potential, http://en.wikipedia.org/wiki/Electrical_potential, printed Dec. 28, 2007, 5 pages.

Electrostatic Potential, "Scalar Potential versus Vector Field", http://www.phy.duke.edu/~rgb/Class/phy42/node10.html, printed Apr. 19, 2006, 2 pages.

Eloy J.C., "Status of the Mems Industry", presentation of Yole Développement, © 2004, 19 pages.

Engst Adamc., "SoundJam Keeps on Jammin'", available at <http://db.tidbits.com/getbits.acgi?tbart=05988>, Jun. 19, 2000, 3 pages.

Esato, "A Couple of My Mates. Meet JasJar and K-Jam (Many Pics)", available at <http://www.esato.com/archive/t.php/t-106524>, retrieved on Apr. 13, 2006, 90 pages.

Extended European Search Report received for European Patent Application No. 11176480.9, dated Oct. 14, 2011, 9 pages.

Extended European Search Report received for European Patent Application No. 18192595.9, dated Dec. 19, 2018, 7 pages.

Eyemodule, "Turn Your Handspring™ Handheld into a Digital Camera", User's Manual, www.eyemodule.com, 2000, 9 pages.

Fastap Keypads Redefine Mobile Phones, Digitwireless, available at <http://www.digitwireless.com>, retrieved on Nov. 18, 2005, 10 pages.

Fastap, DigitWireless, available at <http://www.digitwireless.com/about/faq.html>, Dec. 6, 2005, 5 pages.

Final Office Action received for U.S. Appl. No. 11/769,694, filed Oct. 14, 2010, 12 pages.

Final Office Action received for U.S. Appl. No. 11/769,695, dated Jan. 21, 2011, 16 pages.

Final Office Action received for U.S. Appl. No. 13/903,962 dated Jul. 8, 2014, 8 pages.

Final Office Action received for U.S. Appl. No. 90/012,893, dated Apr. 24, 2014, 118 pages.

Final Office Action received for U.S. Appl. No. 13/903,962, dated Dec. 21, 2015, 10 pages.

Fingerworks Forums, "Is the Multitouch Lemur?", Available at <http://64233.167.104/search?q=cache:sjVdtyFBvRMJ:forums.finger>, retrieved on Nov. 16, 2005, Dec. 24, 2004, 2 pages.

Fingerworks, Inc., "Quick Reference Guide for iGesture Products", available at <http://www.fingerworks.com>, 1999-2002, 2 pages.

Fingerworks, Inc., "Quick Reference Guide for Touchstream ST/LP", available at <http://www.fingerworks.com>, 2001-2003, 4 pages.

Fingerworks, Inc., "Touchstream LP Silver", available at <http://www.fingerworks.com>, Apr. 27, 2005, 18 pages.

Fingerworks, "Installation and Operation Guide for the Touchstream", www.fingerworks.com, Copyright © 2002, 2002, 14 pages.

Frey C., "First Look: Inspiration for the Pocket PC", Innovation Tools, http://www.innovationtools.com/Tools/SoftwareDetails.asp=191, Jul. 7, 2005, 3 pages.

Fromdistance, "Fromdistance MDM—Mobile Device Manager", http://www.fromdistance.com/, 4 pages.

Fromdistance, "MDM—Mobile Video Blogger", http://www.fromdistance.com/eng_mvb.html, Copyright 2006, 1 page.

Garmin, "Go, View Map, Save to Favorites, Cancel", http://www8.garmin.com/buzz/nuvifone/m/g/sc-geotag-lg.jpg, retrieved on Mar. 13, 2015, 1 page.

Gears Leigh, "Orange SPV 0600 Review", Available at <http://www.coolsmartphone.com/article569.html>, retrieved on Apr. 14, 2006, 57 pages.

Grant for Invention received for Chinese Patent Application No. 200780046771.2, dated Jan. 16, 2013, 2 pages.

Griffin Technology, "IFM—Radio, Remote and Recorder for iPod", available at <http://www.griffintechnology.com/products/ifm/index.php>, retrieved on Mar. 17, 2015, 2 pages.

Han JY., "Multi-Touch Sensing Through Frustrated Total Internal Reflection", Available at <http://mrl.nyu.edu/~jhan/ftirsense/>, 2005, 2 pages.

Han, "Multi-touch Interaction Wall", In ACM Siggraph, 2006, 1 page.

Heineman R., "Helio™ Unveils Custom Wireless Experience with Exclusive Handsets and 3G Services", Feb. 16, 2006, 3 pages.

Hesseldahl Arik, "An App the Mac can Brag About", Forbes.com, Available at <http://www.forbes.com/2003/12/15/cx_ah_1215tentech_print.html>, Dec. 15, 2003, 4 pages.

Holzinger Andreas, "Finger Instead of Mouse: Touch Screens as a Means of Enhancing Universal Access", LNCS, 2003, pp. 387-397.

HTC Europe Co. Ltd and Apple Inc. invalidity Claim dated Jul. 29, 2011, together with amended Particulars of Claim and amended Grounds of Invalidity, Jul. 29, 2011, 22 pages.

HTC Europe Co. Ltd and Apple Inc. Invalidity Claim No. HC 12 C 01465, together with annexes, dated Apr. 5, 2012, 12 pages.

IBM, "Visual for Multiple-Icon Drag Movement", IBM Technical Disclosure Bulletin, vol. 37, No. 9, Sep. 1, 1994, pp. 417-418.

(56) References Cited

OTHER PUBLICATIONS

Ichat A V, "Videoconferencing for the Rest of Us", Available at <http://www.apple.com/macosx/features/ichat.html>, Apr. 13, 2006, 3 pages.
Intention to Grant received for European Patent Application No. 07844104.5, dated May 8, 2018, 7 pages.
International Preliminary Report on Patentability received for PCT Patent Application No. PCT/US2007/077307, dated Mar. 10, 2009, 12 pages.
International Preliminary Report on Patentability received for PCT Patent Application No. PCT/US2007/077436, dated Mar. 10, 2009, 10 pages.
International Preliminary Report on Patentability received for PCT Patent Application No. PCT/US2007/080971, dated Apr. 28, 2009, 7 pages.
International Preliminary Report on Patentability received for PCT Patent Application No. PCT/US2007/088884, dated Jul. 7, 2009, 9 pages.
International Search Report and Written Opinion received for PCT Patent Application No. PCT/US2007/077307, dated Jul. 22, 2008, 16 pages.
International Search Report and Written Opinion received for PCT Patent Application No. PCT/US2007/077436, dated Jan. 28, 2008, 12 pages.
International Search Report and Written Opinion received for PCT Patent Application No. PCT/US2007/080971, dated Apr. 15, 2008, 9 pages.
International Search Report and Written Opinion received for PCT Patent Application No. PCT/US2007/088884, dated May 21, 2008, 11 pages.
Introducing the Ultimate Smartphone Keypad, Delta II™ Keypads, available at <http://www.chicagologic.com>, retrieved on Nov. 18, 2005, 2 pages.
Invitation to Pay Additional Fees received PCT Patent Application No. PCT/US2007/077307, dated Mar. 6, 2008, 10 pages.
Kaljuvee et al., "Efficient Web Form Entry on PDAs", May 1-5, 2001, 21 pages.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=47073625&CFTOKEN=65767142>, Oct. 29, 2004, 2 pages.
Knudsen J., "Technical Articles and Tips, Introduction to Mobile Blogging", <http://developers.sun.com.mobility/midp/articles/blogging> retrieved on Jan. 14, 2008, 2 pages.
Korpela Jukka, "Using Inline Frames (iframe elements) to Embed Documents into HTML Documents", (Online), available at <http://web.archive.org/web/20060925113551/http://www.cs.tut.fi/~jkorpela/html/iframe.html>, Sep. 25, 2006, 13 pages.
Macnn, "Garmin Hits iPhone Directly with Nuvifone", <http://www.electronista.com/print/50764> retrieved on Mar. 17, 2008, 3 pages.
MacTech, "Keystrokes 3.5 for Mac OS X Boosts Word Prediction", available at <http://www.mactech.com/news/?p=1007129>, retrieved on Jan. 7, 2008, pp. 1-3.
Martin et al., "Use-Me.Gov", Usability-driven Open Platform for Mobile Government, Copyright © Formatex 2005, 6 pages.
Mashup Camp Blog, "Mashps Explained. The Big Blue Way", <http://blog.mashupcamp.com> retrieved on Aug. 19, 2006, 6 pages.
Mashup Camp, "About Mashup Camp", <http://wiki.mashupcamp.com/index.php/AboutMashupCamp> retrieved on Jan. 14, 2008, 3 pages.
Mashup, "Web Application Hybrid", <http://en.wikipedia.org/wiki/Mashup_%28web_application_hybrid%29> retrieved on Aug. 25, 2006, 9 pages.
Mashups, "The new breed of Web App", <http://www-128.com/developerworks/library/x-mashups.html> retrieved on Aug. 25, 2006, 9 pages.

Microsoft Corporation, "To Answer or Reject a Call", Audiovox PPC 5050, Pocket PC Phone User Manual, Available at <http://www.cellphones.ca/cell-phones/audiovox-ppc-5050/>, Apr. 11, 2008, 3 pages.
Microsoft Touts 'Thumb-as-Stylus' Interface Progress, EE Times, New & Analysis, Available at <https://www.informationweek.com/microsoft-touts-thumb-as-stylus-interface-progress/d/d-id/1031620 >, Apr. 4, 2005, pp. 1-9.
Microwaves RF, "MS Motion Sensors Boost Handset Reliability", http://www.mwrf.cp,/Articles/Print.efm?ArticleID=12740, Copyright 2004, Penton Media Inc., Oct. 13, 2006, 4 Pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, Retrieved on Dec. 17, 2007, Nov. 15, 2002, 10 pages.
Miller Dana, "PersonalJava Application Environment", available at <http://java.sun.com/products/personaljava/touchable/>, Jun. 8, 1999, 12 pages.
Ming User Manual, Motorola, 2006, 141 pages.
Mitchell Robert, "GUI Gets a Makeover", Available at http://www.computerworld.com/action/article.do?command=printArticleBasic&articleId=263695, Sep. 25, 2006, 7 pages.
Mobhappy, "Location Based Taxis Meets LBS Advertising", <http://mobhappy.typepad.com/russell_buckleys_mobhappy/2005/10/location_based_.html> retrieved on May 19, 2006, 3 pages.
Mobile Box Office™, "See How It Works", <http://www.mbo.com/web/index.jsp> retrieved on Oct. 17, 2006, 1 page.
Mobile Tech News, "T9 Text Input Software Updated", available at <http://www.mobiletechnews.com/info/2004/11/23/122155.html>, Nov. 23, 2004, 4 pages.
Mobiqa, "Welcome to Mobiqa", <http://www.mobiqa.com> retrieved on Oct. 17, 2006, 2 pages.
Moblog-Wikipedia, "Moblog", <http://en.wikipedia.org/wiki/Moblog> retrieved on Apr. 5, 2006, 4 pages.
Model 8690 Inter-Tel Protocol Mode User Guide, Inter-Tel, Part No. 550.8116, Issue 11, Mar. 2006, 160 pages.
Morenet, "Dialing Plan—Research and Innovation—Technical Support", <http://www.more.net/technical/research/dialplan/index.html.> retrieved on Jan. 11, 2008, 10 pages.
Motorola A1000 User Guide, Motorola, Sep. 15, 2004, pp. 1-122.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Mountfocus Information Systems, "An Onscreen Virtual Keyboard: touchscreen, kiosk and Windows compatible", Available at: http://www.virtual-kevboard.com, Dec. 19, 2007, 3 pages.
Move Mobile Systems, "Take the Real Web with You", <http://www.movemobile.com> retrieved on Nov. 29, 2005, 1 page.
ms mobiles.com—Simply Mobile, "New Program for Mobile Blogging for Pocket PC Release:My Blog", Available online at <http://msmobiles.com/news.php/4067.html>, 2005, 1 page.
Multimedia Soft, "3D Control Magic for NET", <http://www.multimediasoft.com/3dcm> retrieved on Dec. 18, 2007, 2 pages.
Myers Brada., "Shortcutter for Palm", available at <http://www.cs.cmu.edu/~pebbles/v5/shortcutter/palm/index.html>, retrieved on Jun. 18, 2014, 10 pages.
Namahn, "User-centered Design of Mobile Solutions—A New Paradigm", 2006, 15 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
Nokia 5140 User Guide, Issue 1, 2004, 66 pages.
Nokia 9110 User's Manual, Issue 3, Jun. 7, 1998, 190 pages.
Nokia, "7280 Bedienungsanleitung", Available at <htpp://web.archive.org/web/20051222023851/http://ndsl.nokia.com/phones/files/guides/nokia7280 UDG-de.pdf>, 2005, pp. 1-101.
Nokia, "7280 Interactive Demonstrations", Screenshot, available at <http://web.archive.org/web/2005112502636/europe.nokia.com/support/tutorials/7280/german/index.htm>, Nov. 25, 2005, 2 pages.

(56) References Cited

OTHER PUBLICATIONS

Nokia, "Nokia 7280 User Manual", Available at <http://nds1.nokia.com/phones/files/guides/Nokia_7280_UG-en.pdf>, Nov. 25, 2004, 74 pages.
Nokia, "Nokia 9000i User's Manual", Issue 2, Jun. 7, 1998, 126 pages.
Nokia, "Press Backgrounder—Guide to Moblogging", Feb. 2005, 3 pages.
Nokia—Enhancements, "Nokia Video Call Stand PT-8", Apr. 13, 2006, 2 pages.
Nokia—Phone Features, "Nokia 6630 Imaging Smartphone", Available at <http://europe.nokia.com/nokia/0,8764,58711,00.html>, Apr. 13, 2006, 5 pages.
Non-Final Office Action received for U.S. Appl. No. 11/553,429, filed Jul. 21, 2011, 21 pages.
Non-Final Office Action received for U.S. Appl. No. 11/553,429, dated Oct. 6, 2010, 18 pages.
Non-Final Office Action received for U.S. Appl. No. 11/769,695, dated Oct. 27, 2011, .17 pages.
Non-Final Office Action received for U.S. Appl. No. 13/596,652, dated Sep. 19, 2012, 7 pages.
Non-Final Office Action received for U.S. Appl. No. 16/434,794, dated Apr. 16, 2020, 14 pages.
Non-Final Office Action received for U.S. Appl. No. 11/553,429, filed Jun. 21, 2010, 14 pages.
Non-Final Office Action received for U.S. Appl. No. 11/769,694, filed May 6, 2010, 11 pages.
Non-Final Office Action received for U.S. Appl. No. 11/769,695, dated Sep. 3, 2010, 21 pages.
Non-Final Office Action received for U.S. Appl. No. 11/960,673, dated Oct. 28, 2010, 10 pages.
Non-Final Office Action received for U.S. Appl. No. 13/176,703, dated Apr. 30, 2014, 10 pages.
Non-Final Office Action received for U.S. Appl. No. 13/903,962, dated Apr. 20, 2015, 6 pages.
Non-Final Office Action received for U.S. Appl. No. 13/903,962, dated Nov. 1, 2013, 6 pages.
Non-Final Office Action received for U.S. Appl. No. 14/632,817, dated Jun. 4, 2015, 10 pages.
Non-Final Office Action received for U.S. Appl. No. 15/137,127, dated Jan. 30, 2017, 8 pages.
Non-Final Office Action received for U.S. Appl. No. 15/620,662, dated Oct. 4, 2018, 8 pages.
Non-Final Office Action received for U.S. Appl. No. 90/012,893, dated Dec. 5, 2013, 119 pages.
Notice of Acceptance received for Australian Patent Application No. 2008203349, dated Jul. 15, 2011, 3 pages.
Notice of Acceptance received for Australian Patent Application No. 2011244866, dated Jan. 14, 2015, 3 pages.
Notice of Acceptance received for Australian Patent Application No. 2015202221, dated Aug. 24, 2016, 2 pages.
Notice of Allowance received for U.S. Appl. No. 11/553,429, dated Apr. 4, 2011, 6 pages.
Notice of Allowance received for U.S. Appl. No. 11/553,429, dated Feb. 14, 2011, 5 pages.
Notice of Allowance received for U.S. Appl. No. 11/553,429, filed Nov. 7, 2011, 8 pages.
Notice of Allowance received for U.S. Appl. No. 11/769,694, dated Apr. 15, 2011, 8 pages.
Notice of Allowance received for U.S. Appl. No. 11/769,694, dated Jun. 1, 2011, 21 pages.
Notice of Allowance received for U.S. Appl. No. 11/960,673, dated Mar. 31, 2011, 5 pages.
Notice of Allowance received for U.S. Appl. No. 13/176,703, dated Dec. 23, 2014, 2 pages.
Notice of Allowance received for U.S. Appl. No. 13/176,703, dated Oct. 21, 2014, 5 pages.
Notice of Allowance received for U.S. Appl. No. 13/205,586, dated Jan. 24, 2012,.7 pages.
Notice of Allowance received for U.S. Appl. No. 13/205,586, dated Nov. 21, 2011, 8 pages.
Notice of Allowance received for U.S. Appl. No. 13/418,322, dated May 11, 2012, 9 pages.
Notice of Allowance received for U.S. Appl. No. 13/596,652, dated Feb. 7, 2013, 7 pages.
Notice of Allowance received for U.S. Appl. No. 13/596,652, dated Jan. 9, 2013,7 pages.
Notice of Allowance received for U.S. Appl. No. 13/903,962, dated Dec. 16, 2014, 9 pages.
Notice of Allowance received for U.S. Appl. No. 14/632,817, dated Dec. 16, 2015, 6 pages.
Notice of Allowance received for U.S. Appl. No. 15/137,127, dated Mar. 27, 2017, 5 pages.
Notice of Allowance received for U.S. Appl. No. 15/620,662, dated Jan. 30, 2019, 5 pages.
Notice of Allowance received for U.S. Appl. No. 16/434,794, dated Jan. 12, 2021, 13 pages.
Notice of Grant received for Chinese Patent Application No. 201210261995.8, dated Jul. 4, 2014, 2 pages.
Notice of Intent received for U.S. Appl. No. 90/012,893, dated Aug. 8, 2014, 9 pages.
Office Action received for Australian Patent Application No. 2008203349, dated Feb. 19, 2010, 3 pages.
Office Action received for Australian Patent Application No. 2009100722, dated Oct. 5, 2009, 2 pages.
Office Action received for Australian Patent Application No. 2009100723, dated Oct. 9, 2009, 2 pages.
Office Action received for Australian Patent Application No. 2011244866, dated Sep. 23, 2013, 3 pages.
Office Action received for Australian Patent Application No. 2015202221, dated Feb. 29, 2016, 4 pages.
Office Action received for Australian Patent Application No. 2016269522, dated Jan. 5, 2018, 4 pages.
Office Action received for Australian Patent Application No. 2016269522, dated Oct. 4, 2018, 3 pages.
Office Action received for Chinese Patent Application No. 200780040472.8, dated Jan. 18, 2012, 4 pages.
Office Action received for Chinese Patent Application No. 200780046771.2, dated Dec. 12, 2011, 9 pages.
Office Action received for Chinese Patent Application No. 200780046771.2, dated Sep. 13, 2012, 6 pages.
Office Action Received for Chinese Patent Application No. 201210261995.8, dated Dec. 4, 2013, 5 pages.
Office Action received for European Patent Application No. 07841759.9, dated Aug. 13, 2009, 7 pages.
Office Action received for European Patent Application No. 07841759.9, dated May 25, 2010, 5 pages.
Office Action received for European Patent Application No. 07844104.5, dated Jul. 12, 2011, 6 pages.
Office Action received for European Patent Application No. 07844104.5, dated Mar. 27, 2013, 4 pages.
Office Action Received for European Patent Application No. 078441045, dated Nov. 10, 2015, 6 pages.
Office Action received for European Patent Application No. 11176480.9, dated Nov. 14, 2014, 5 pages.
Office Action received for European Patent Application No. 11176480.9, dated Nov. 8, 2016, 12 pages.
Office Action received for European Patent Application No. 18192595.9, dated Apr. 16, 2020, 5 pages.
Office Action received for European Patent Application No. 18192595.9, dated Dec. 4, 2020, 3 pages.
Office Action received for German Patent Application No. 112007001109.2, dated Sep. 14, 2010, 28 pages.
O'Neal, "Smart Phones with Hidden Keyboards", available at <http://msc.com/4250-6452_16-6229969-1.html>, Nov. 18, 2005, 3 pages.
Onelook, "", Dictionary Search; Retrieved from the Internet: http://onelook.com/?w=adjacent&ls=a, Retrieved on Jan. 7, 2008, 5 pages.
Openwave, "inside the Wave-Alliances Fuel Location Services", Retrieved from the Internet: http://www.openwave.com/us/openwave_iq/inside_wave/2003/july/location_services, Jul. 2003, 2 pages.

(56) References Cited

OTHER PUBLICATIONS

Opera Software, "Opera 8.5 Beta 2 for Windows Mobile, Pocket PC", Available at <http://www.opera.com/products/mobile/products/winmobileppc>, retrieved on Apr. 5, 2006, 2 pages.
Opera Software, "Opera 8.5 for S60 Phones—Get the Full Internet Experience on Your Mobile Phone", Available at <http://www.symbian-freak.com/news/1105/opera.htm>, Oct. 14, 2005, 3 pages.
Opera Software, "Opera for Mobile, The Full Web Anytime, Anywhere", Available at <www.opera.com/mobile>, Jan. 2006, 7 pages.
Opera Software, "Opera for S60 Tutorial", Available at <http://www.xmarks.com/site/www.opera.com/support/tutorials/s60/>, retrieved on Apr. 5, 2006, 5 pages.
Opera Software, "Opera for Windows Mobile Smartphone 2003 Tutorial", Available at <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.
P900/P908 White Paper, Sony Ericsson, Dec. 2003, pp. 1-128.
Padilla Alfredo, "Palm Treo 750 Cell Phone Review - Messaging", available at <http://www.wirelessinfo.com/content/palm-Treo-750-Cell-Phone-Review/Messaging.htm>, Mar. 17, 2007, 6 pages.
Palm Treo 700w User Manual, Palm, 2005, 96 pages.
Palmone, "Your Mobile Manager", Chapter 2, LifeDriveT User's Guide, available at <http://www.palm.com/us/support/handbooks/lifedrive/en/lifedrive_handbook.pdf>, 2005, 23 pages.
PdQTM Applications Handbook, Qualcomm, 1999, 192 pages.
Pfeiffer, "Who Will Make the iPod Phone? And When?", eWeek, http://www.eweek.com/print_article2/0,1217,a=146078,00asp, Feb. 17, 2005, 3 pages.
Plaisant et al., "Touchscreen Toggle Design", Proceedings of the Conference on Human Factors in Computing Systems, May 3-7, 1992, pp. 667-668.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
Roos Gina, "Agilent's New Proximity Sensor Beats the Fumble-fingered Competition Hands Down . . . Literally", Available at <http://www.eeproductcenter.com/article/printalbeArticle.jhtml>, Sep. 1, 2004, 3 pages.

*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Savov, "iPhone and Magic Mouse linked up by BT stack", (video) Jan. 4, 2010, http://www.engadget.com/2010/01/04/iphone-and-magic-mouse-linked-up-by-btstack-video/, 5 pages.
SPH-i700 Series Digital Dual-Band Mobile Phone User Guide, Samsung, 2004, 133 pages.
Summons to Attend Oral Proceedings received for European Patent Application No. 11176480.9, mailed on Apr. 26, 2016, 6 pages.
Summons to Attend Oral Proceedings received for the European Application No. 07841759.9, mailed on May 17, 2011, 4 pages.
TAKEphONE User Manual, Feb. 21, 2005, 32 pages.
TAKEphONE User Manual, Jun. 15, 2006, pp. 1-40.
TealPhone User's Manual, TealPoint Software, Jan. 24, 2006, 44 pages.
The Kyocera 7135 Smartphone: Reference Guide, Kyocera, 2002, 224 pages.
The Kyocera 7135 Smartphone: Reference Guide, Kyocera, 2003, 12 pages.
Third Party rejection received for U.S. Appl. No. 90/012,893, mailed on Jun. 14, 2013, 341 pages.
Tidwell Jenifer, "Designing Interfaces, Animated Transition", Archieved by Internet Wayback Machine, Available at <https://web.archive.org/web/20060205040223/http://designinginterfaces.com:80/Animated_Transition>, Retrieved on Mar. 20, 2018, 2005, 2 pages.
User's Guide Agendus for Symbian OS UIQ Edition, Iambic, 2003, pp. 1-23.
Using Your Palm Treo 700w Smartphone, Palm, p. 30, 31, 48, 49, 52, 130, 253, 254, 2005-2006, 290 pages.
Using Your TreoTM 650 Smartphone, Palmone, Dec. 7, 2004, 208 pages.
Williams Martyn, "LG's Cell Phone Can Pause Live TV", PC World, Oct. 11, 2005, 2 pages.
XPlore M98 User Manual, Group Sense PDA, Jul. 14, 2005, pp. 1-138.
Office Action received for European Patent Application No. 18192595.9, dated Sep. 17, 2021, 5 pages.

* cited by examiner

PORTABLE MULTIFUNCTION DEVICE, METHOD, AND GRAPHICAL USER INTERFACE FOR CONFERENCE CALLING

RELATED APPLICATIONS

This application is a continuation of U.S. patent application Ser. No. 16/434,794, entitled "Portable Multifunction Device, Method, and Graphical User Interface for Conference Calling," filed Jun. 7, 2019, which is a continuation of U.S. patent application Ser. No. 15/620,662, entitled "Portable Multifunction Device, Method, and Graphical User Interface for. Conference Calling," filed Jun. 12, 2017, now U.S. Pat. No. 10,320,987, which is a continuation of U.S. patent application Ser. No. 15/137,127, entitled "Portable Multifunction Device, Method, and Graphical User Interface for Conference Calling," filed Apr. 25, 2016, now U.S. Pat. No. 9,706,054, which is a continuation of U.S. patent application Ser. No. 14/632,817, entitled "Portable Multifunction Device Method, and Graphical User Interface for Conference Calling," filed Feb. 26, 2015, now U.S. Pat. No. 9,325,852, which is a continuation of U.S. patent application Ser. No. 13/176,703, entitled "Portable Multifunction Device, Method, and Graphical User Interface for Conference Calling," filed Jul. 5, 2011, now U.S. Pat. No. 8,972,904, which is a continuation of U.S. application Ser. No. 11/960,673, filed Jan. 7, 2007, now U.S. Pat. No. 7,975,242, entitled "Portable Multifunction Device, Method, and Graphical User Interface for Conference Calling" which claims priority to U.S. Provisional Patent Application Nos. 60/937,993, "Portable Multifunction Device," filed Jun. 29, 2007; 60/947,133, "Portable Multifunction Device, Method, and Graphical User Interface for Conference Calling," filed Jun. 29, 2007; 60/879,469, "Portable Multifunction Device," filed Jan. 8, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable devices that provide graphical user interfaces for managing a conference call among three or more parties.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Many cell phones support a "conference call" feature that allows three or more parties (corresponding to three or mote phones) to participate in a single conversation simultaneously. At present, however, it is difficult for a cell phone user to manage a conference call, including such tasks as adding a new party to the conference call, removing an existing party from the conference call, temporarily converting the conference call into a private phone call with one of the existing parties, and returning to the conference call from the private phone call. With present devices, it is not readily apparent to a user how to perform these tasks.

Accordingly, there is a need for portable multifunction devices with more transparent and intuitive user interfaces for managing a conference call between multiple parties that are easy to use, configure, and/or adapt. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

One aspect of the invention involves a computer-implemented method performed by a portable multifunction device with a touch screen display. The method includes: displaying a phone call user interface on the touch screen display. The phone call user interface includes: a first informational item associated with an active phone call between a user of the device and a first party, a second informational item associated with a suspended phone call between the user and a second party, and a merge call icon. The method also includes: upon detecting a user selection of the merge call icon, merging the active phone call and the suspended phone call into a conference call between the user, the first party, and the second party, and replacing the phone call user interface with a conference call user interface. The conference call user interface includes: a third informational item associated with the conference call in replacement of the first and second informational items, and a conference call management icon.

Another aspect of the invention involves a portable multifunction device that includes a touch screen display, one or more processors, memory, and one or more programs. The one or more programs are stored in the memory and configured to be executed by the one or more processors. The programs includes: instructions for displaying a phone call user interface on the touch screen display, the phone call user interface including: a first informational item associated with an active phone call between a user of the device and a first party, a second informational item associated with a suspended phone call between the user and a second party, and a merge call icon; instructions for merging the active phone call and the suspended phone call into a conference call between the user, the first party, and the second party upon detecting a user selection of the merge call icon; and instructions for replacing the phone call user interface with a conference call user interface upon detecting the user selection of the merge call icon. The conference call user interface includes: a third informational item associated with the conference call in replacement of the first and second informational items, and a conference call management icon.

Another aspect of the invention involves a computer-program product that includes a computer readable storage medium and a computer program mechanism embedded therein. The computer program mechanism includes instructions, which when executed by a portable multifunction device with a touch screen display, cause the device to: display a phone call user interface on the touch screen display, the phone call user interface including: a first informational item associated with an active phone call between a user of the device and a first party, a second informational item associated with a suspended phone call between the user and a second party, and a merge call icon; merge the active phone call and the suspended phone call into a conference call between the user, the first party, and the second party upon detecting a user selection of the merge call icon; and replace the phone call user interface with a conference call user interface upon detecting the user selection of the merge call icon. In some embodiments, the conference call user interface includes: a third informational item associated with the conference call in replacement of the first and second informational items, and a conference call management icon.

Another aspect of the invention involves a phone call graphical user interface on a portable multifunction device with a touch screen display. The phone call graphical user interface includes: a first informational item associated with an active phone call between a user of the device and a first party, a second informational item associated with a suspended phone call between the user and a second party, and a merge call icon. Upon detecting a user selection of the merge call icon, the active phone call and the suspended phone call are merged into a conference call between the user, the first party, and the second party and the phone call graphical user interface is replaced with a conference call user interface. The conference call user interface includes: a third informational item associated with the conference call in replacement of the first and second informational items, and a conference call management icon.

Another aspect of the invention involves a portable multifunction device with a touch screen display. The device includes: means for displaying a phone call user interface on the touch screen display, the phone call user interface including: a first informational item associated with an active phone call between a user of the device and a first party, a second informational item associated with a suspended phone call between the user and a second party, and a merge call icon; means for merging, upon detecting a user selection of the merge call icon, the active phone call and the suspended phone call into a conference call between the user, the first party, and the second party; and means for replacing, upon detecting the user selection of the merge call icon, the phone call user interface with a conference call user interface. The conference call user interface includes: a third informational item associated with the conference call in replacement of the first and second informational items, and a conference call management icon.

Thus, the invention provides a transparent and intuitive user interface for managing conference calls on a portable multifunction device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
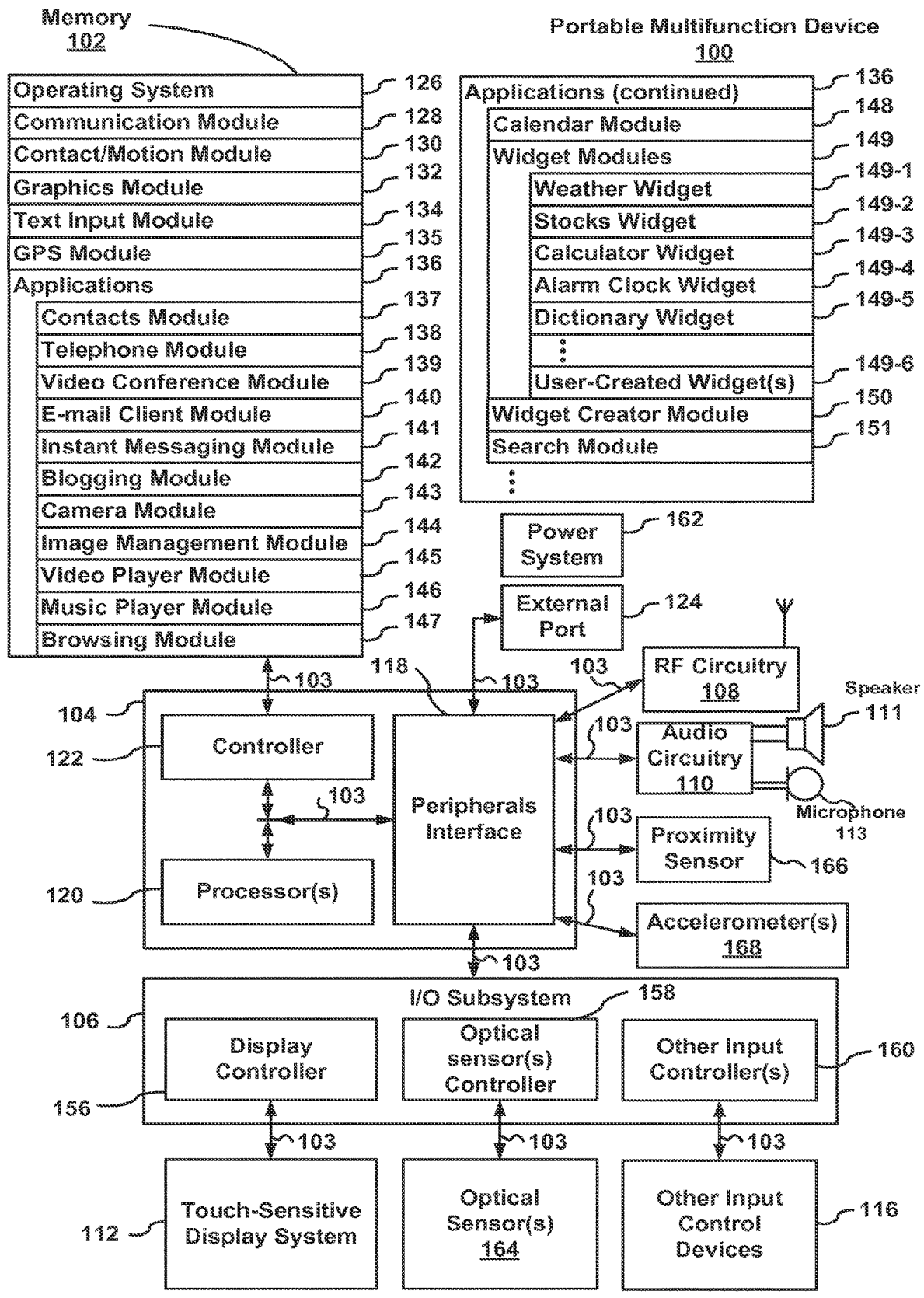
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such its PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied front one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
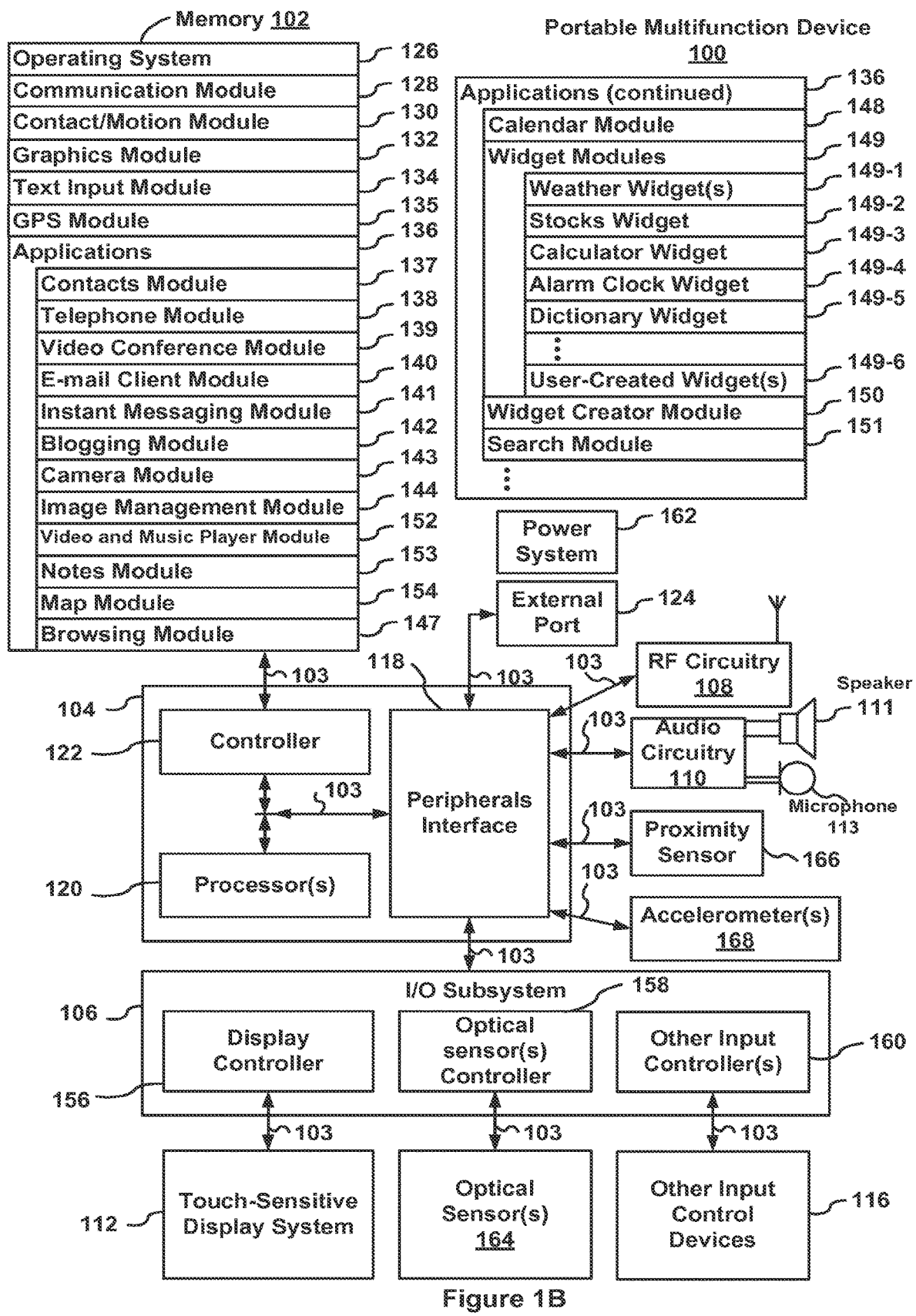

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-COMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 116 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controllers) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference herein in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or acts of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference herein in their entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/003,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Semen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the tough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semi transparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; 11/240,788 "Proximity Detect In Handheld Device," filed Sep. 30, 2005; 11/620,702, filed Jan. 7, 2007, "Using Ambient Light Sensor To Augment Proximity Sensor Output"; Ser. No. 11/586,862, filed Oct. 24, 2006, "Automated Response To And Sensing Of User Activity In Portable Devices"; and Ser. No. 11/638,251, filed Dec. 12, 2006, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication. No. 20060017692, "Methods And Apparatuses For Operating A Portable Device Based On An Accelerometer," both of which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or
- map module 154.

Examples of other applications 136 that may be stored in memory 102 include other word processing applications, JAVA-enabled applications, encryption, digital rights management, voice recognition, and voice replication.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation with another party or with multiple parties (i.e., a conference call) and disconnect or hang up when the conversation is completed. As noted above, the wireless communication may use any of a plurality of communications standards, protocols and technologies. Embodiments of user interfaces and associated processes using telephone module 138 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
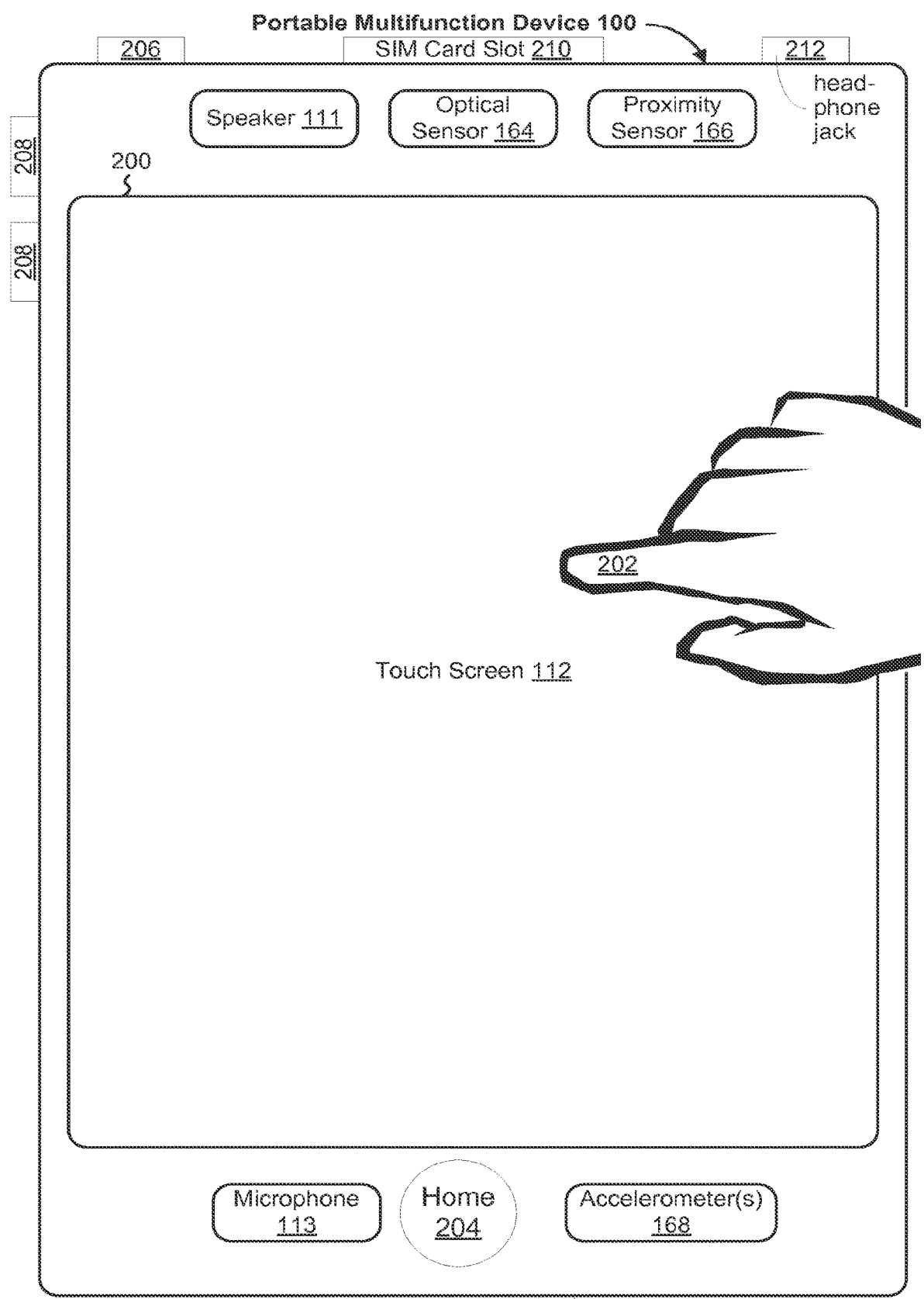
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device cm/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
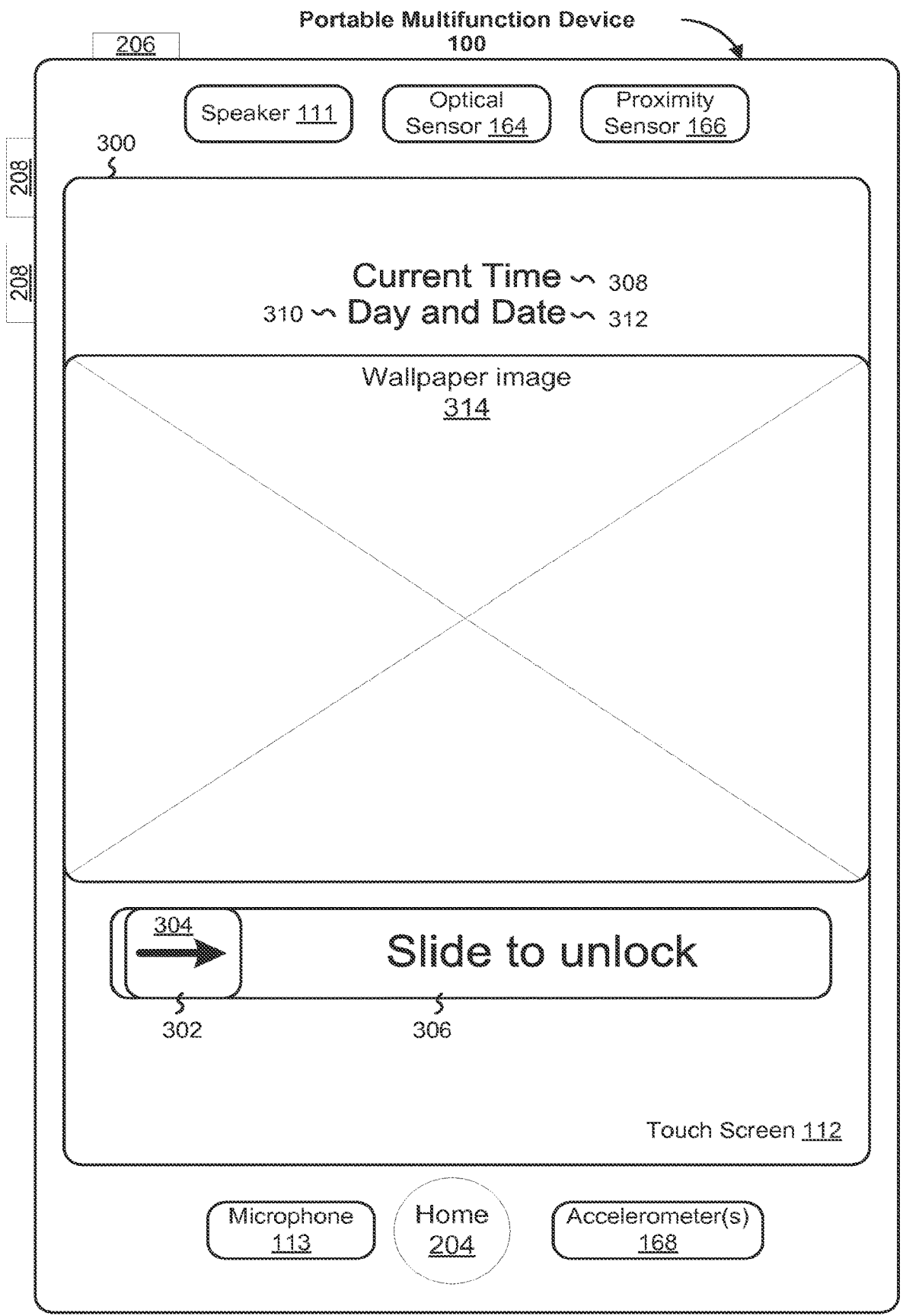
FIG. 3 illustrates an exemplary user interface for unlocking a portable electronic device in accordance with some embodiments.

FIG. 3 illustrates an exemplary user interface for unlocking a portable electronic device in accordance with some embodiments, in some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image." filed Dec. 23, 2005, and Ser. No. 11/322,550, "Indication Of Progress Towards Satisfaction Of A User Input Condition," filed Dec. 23, 2005, which are hereby incorporated by reference herein in their entirety.

Figure 4A:
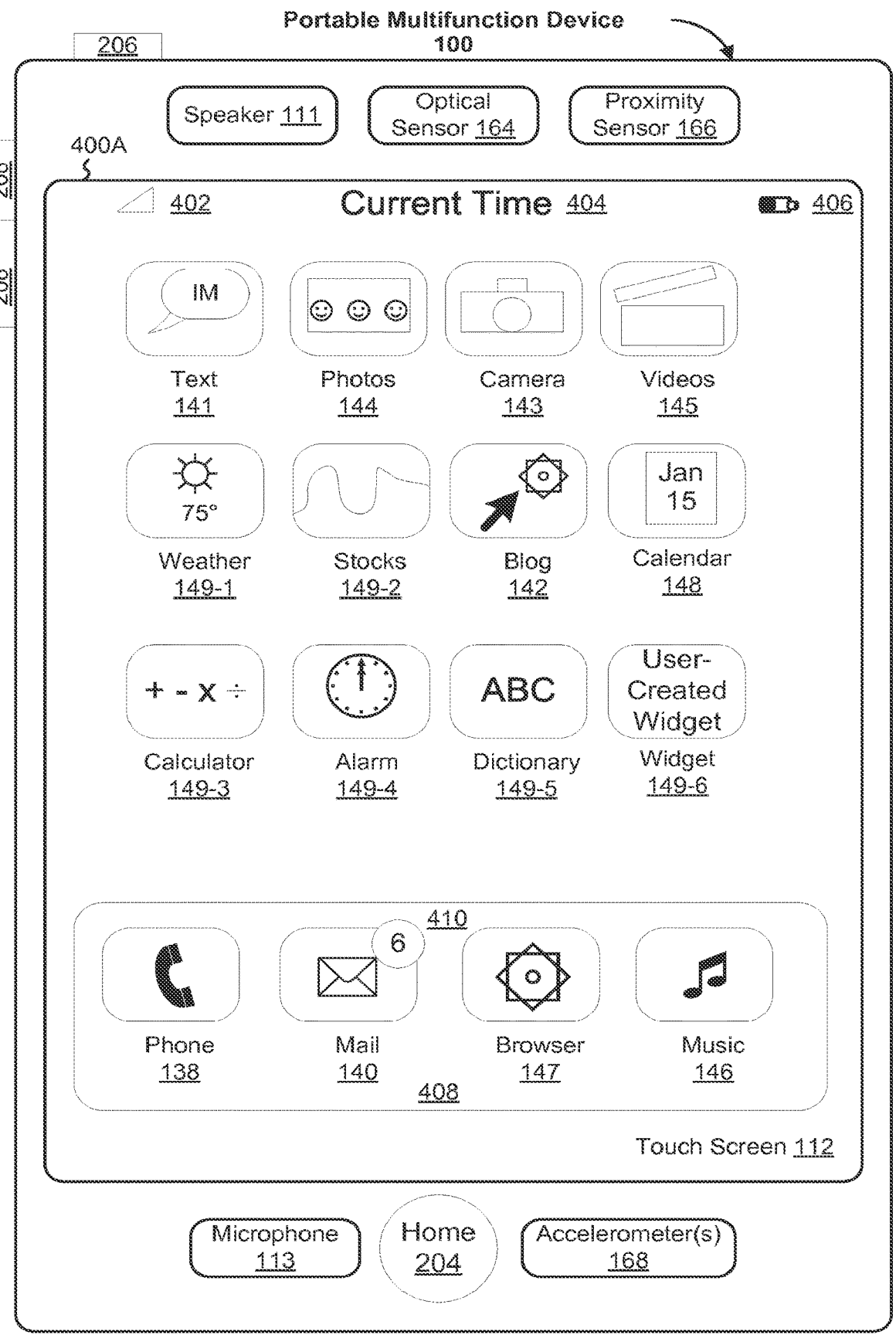
FIGS. 4A and 4B illustrate exemplary user interfaces for a menu of applications on a portable multifunction device in accordance with some embodiments.
Figure 4B:
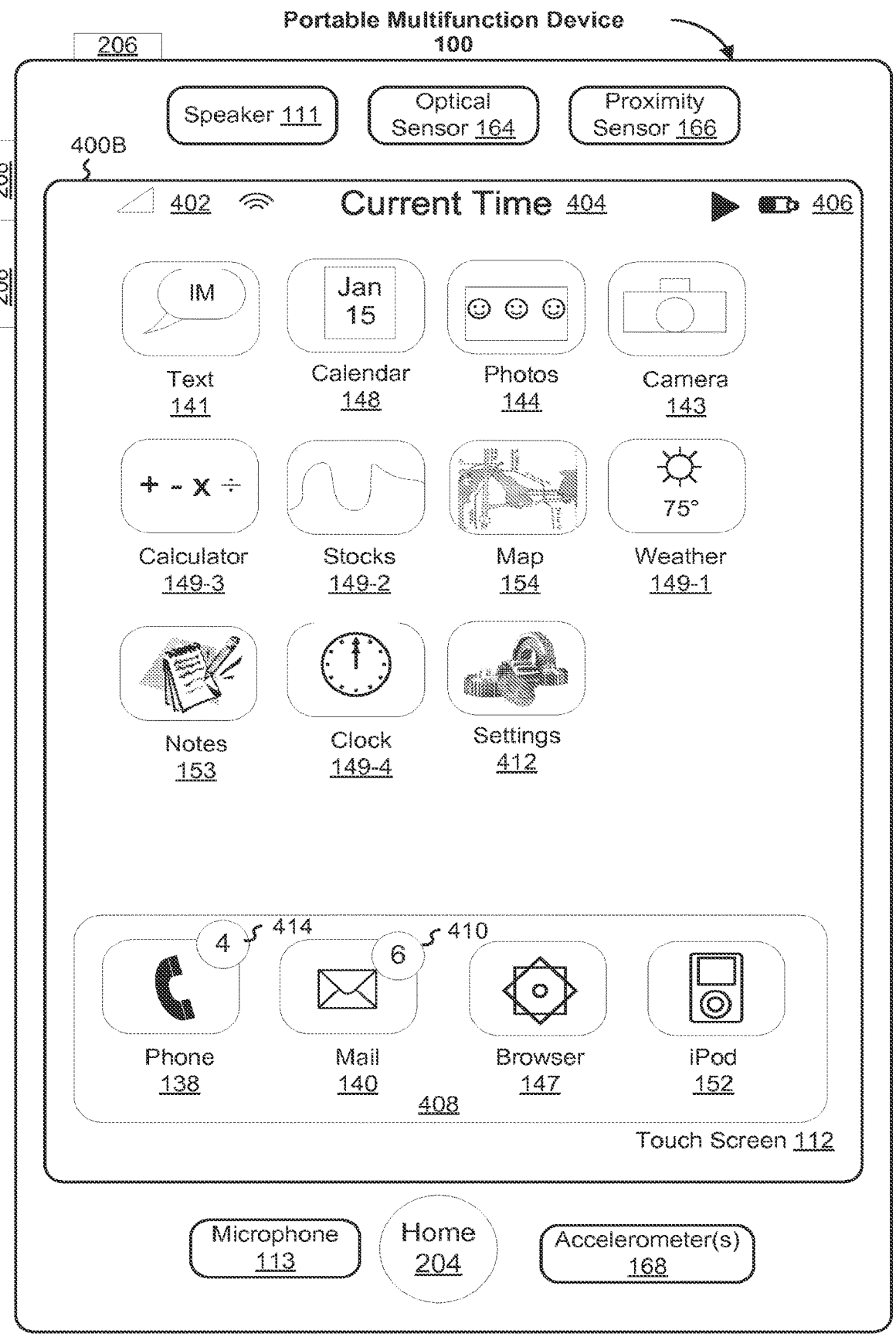

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicators) 402 for wireless communication(s), such as cellular and Wi-Fi signals;
Time 404;
Battery status indicator 406;
Tray 408 with icons for frequently used applications, such as one or more of the following:
  Phone 138, which may include an indicator 414 of the number of missed calls or voicemail messages;
  E-mail client 140, which may include an indicator 410 of the number of unread e-mails;
  Browser 147; and
  Music player 146; and Icons for other applications, such as one or more of the following:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136; and
  Video and music player module 152, also referred to as iPod (trademark of Apple Computer, Inc.) module 152.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other linger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference herein in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference herein in its entirety.

In the discussion of FIGS. 5-13 below and in the claims, several user interfaces on the touch screen display are referred to, including a "phone call" user interface; a "conference call" user interface; a "conference call management" user interface; and an "incoming phone call" user interface. These user interfaces could equivalently be referred to as a first user interface, a second user interface, a third user interface, and a fourth user interface, respectively. The first user interface (i.e., the phone call user interface) includes a merge call icon and informational items associated with separate calls. The second user interface (i.e., the conference call user interface) includes an informational item associated with the conference call and a conference call management icon (i.e., an icon that when activated by a finger tap or other gesture brings up the display of the third user interface, the conference call management interface). The third user interface (i.e., the conference call management user interface) includes management entries corresponding to the other parties in the conference call, one or more end call icons and one or more private call icons. The fourth user interface (i.e., the incoming call user interface) includes an ignore incoming phone call icon, a suspend current phone call and answer incoming phone call icon, and an end current phone call and answer incoming phone call icon. For clarity and ease of discussion, these interfaces will be referred to in the specification and claims by the labels "phone call," "conference call," "conference call management," and "incoming call," rather than by the labels first, second, third, and fourth.

In some embodiments, a respective information item associated with a telephone call or conference call includes both a call descriptor (e.g., a name of the other party to the call, a telephone number, or a label such as "conference") and a call status indicator, such as a call duration value (e.g., "00:05") or call status (e.g., "Hold" or "On Hold"). However, in some embodiments or some interfaces, a respective information item may include the descriptor, or the status indicator, but not both.

Figure 12:
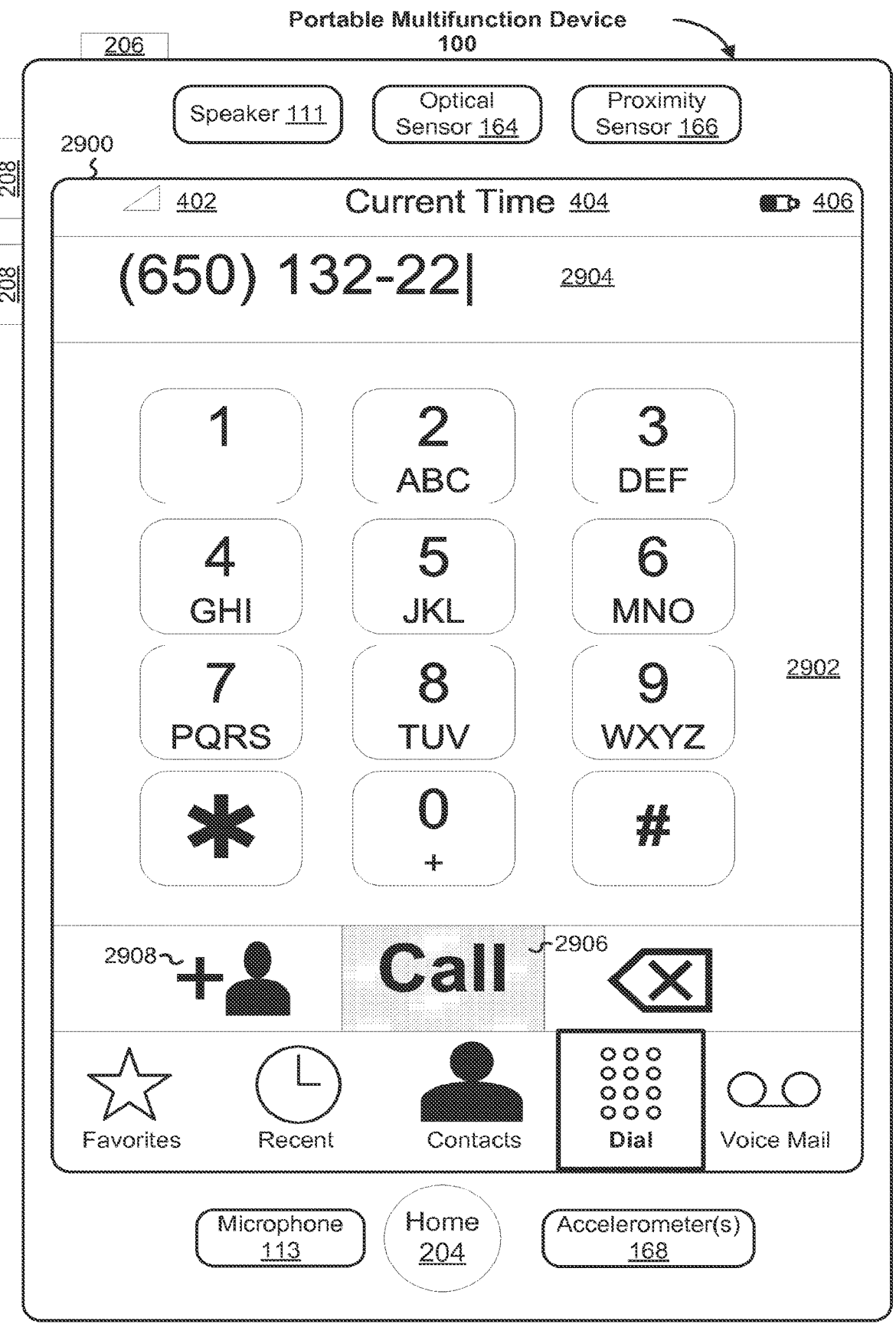
FIG. 12 illustrates an exemplary dial pad interface for calling in accordance with some embodiments.

FIG. 12 illustrates an exemplary dial pad interface for calling in accordance with some embodiments. In response to the user activating the number keys in dial pad 2902 (e.g., by finger taps on the number icons), the touch pad displays the selected digits 2904. In some embodiments, the phone module 138 automatically adds the parentheses and dashes to the selected digits to make the number easier to read. In response to the user activating the call icon 2906, the phone module 138 dials or transmits the selected digits. In response to the user activating the create contact icon 2908, numbers entered with the touchpad may be used in a new contact or added to an existing contact.

In some embodiments, the device performs location-based dialing, which simplifies dialing when the user is located outside his/her home country and/or is trying to dial a destination number outside his/her home country.

Additional description of location-based dialing can be found in U.S. Patent Application No. 60/883,800, "Method, Device, And Graphical User Interface For Location-Based Dialing," filed Jan. 7, 2007, the content of which is hereby incorporated by reference herein in its entirety.

In some embodiments, a user of the device 100 may want to create a conference call that involves the user and at least two other parties. For ease of discussion, assume that the user initiates a call with a second party. After the second party associated with the user-entered phone number answers the phone call, a connection is made between the user and the second party and the two sides can have a conversation. Then, assume the device 100 receives an incoming call from a first party.

Figure 5:
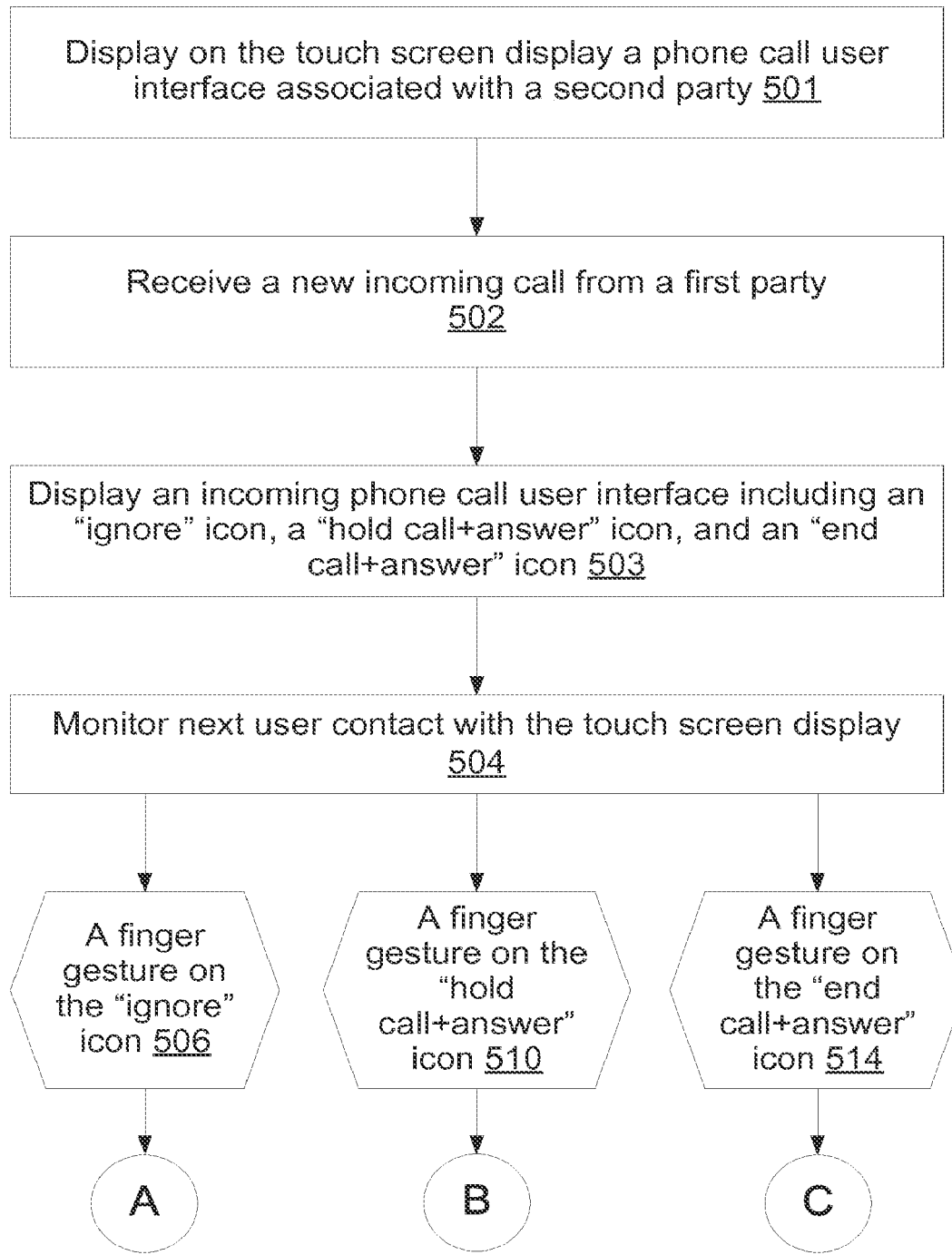
FIG. 5 is a flow diagram illustrating a process for displaying an incoming phone call user interface in accordance with some embodiments.

FIG. 5 is a flow diagram illustrating a process for displaying an incoming phone call user interface in accordance with some embodiments. Following the establishment of a connection (e.g., between the user and the second party), the device 100 displays a phone call user interface on the touch screen display (501). An exemplary phone call user interface 3000B is shown in FIG. 13B, which is described in more detail below. In some embodiments, the UI 3000B includes an add call icon 3018. The user can select this icon to start a new phone call with another party without terminating the phone call with the second party (which may be temporarily suspended). Subsequently, the user can merge the two phone calls into a conference call among the three parties.

While the phone call between the user and the second party is active, the device 100 receives a new incoming call from a first party (502). To alert the user of the incoming call, the device 100 replaces the phone call user interface with an incoming phone call user interface (503). Note that the user interface change does not suspend or terminate the ongoing phone call between the user and the second party. An exemplary incoming phone call user interface 3000C is shown in FIG. 13C, which is described in more detail below. In some embodiments, the UI 3000C includes an "ignore" icon 3026, a "hold call+answer" icon 3028, and an "end call+answer" icon 3030, each icon corresponding to a predefined set of operations. Other labels that indicate the ignore, hold call+answer, and end call+answer functions may also be used on icons 3026, 3028, and 3030, respectively.

To determine which, if any, icon is selected by the user and therefore what operations to perform, the device 100 monitors the next user contact with the touch screen display (504). For example, a finger tap or other predefined gesture on the "ignore" icon (506) indicates that the user chooses to continue the phone call with the second party and not to answer the incoming call.

Figure 6:
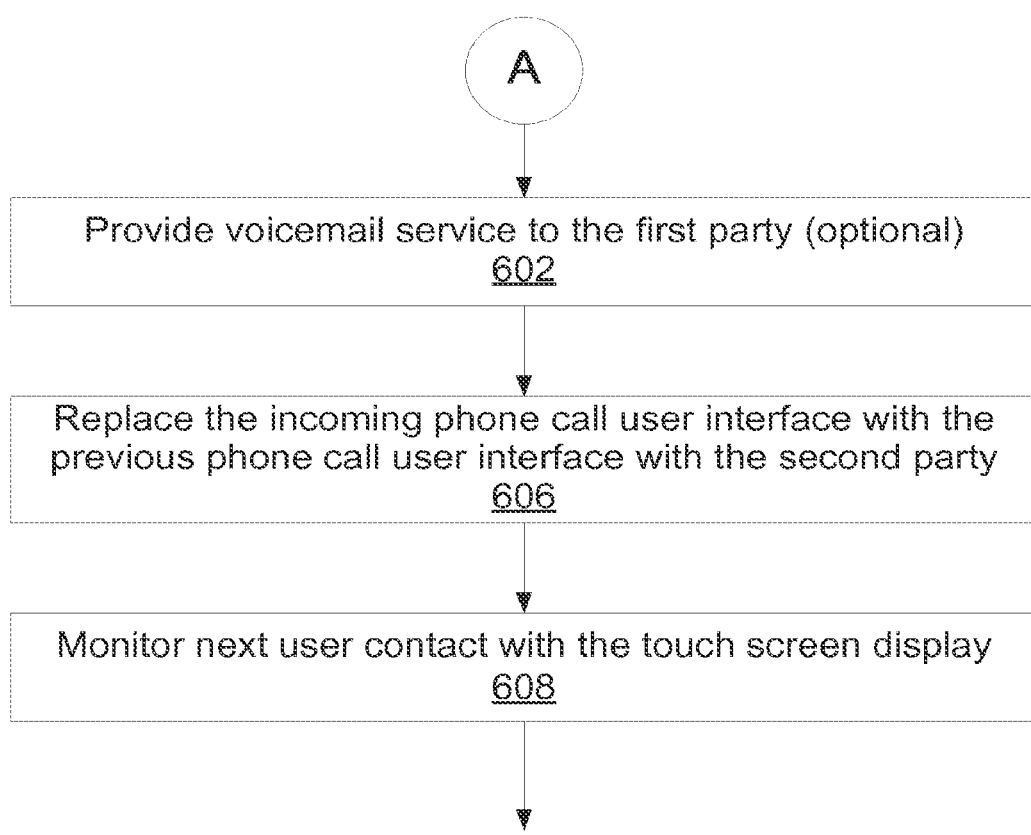
FIG. 6 is a flow diagram illustrating a process for declining an incoming call in accordance with some embodiments.

FIG. 6 is a flow diagram illustrating a process for declining an incoming call in accordance with some embodiments. In some embodiments, the device 100 simply terminates the incoming call from the first party. In some other embodiments, the device 100 optionally provides a voicemail service for the first party to leave a voicemail message for the user (602). In either case, the incoming phone call user interface 3000C is replaced with the previous phone call user interface 3000B (606). Accordingly, the user continues the phone call with the second party while the device 100 monitors the next user contact with the touch screen display (608). In some embodiments, substantially the same process described above applies when the user is having a conference call with multiple parties, an incoming call arrives, and the user declines the incoming call.

In some embodiments, the device 100 detects the user's finger tap or other predefined gesture on the "end call+ answer" icon (514), suggesting that the user chooses to terminate the phone call with the second party and answer the incoming call from the first party.

Figure 7:
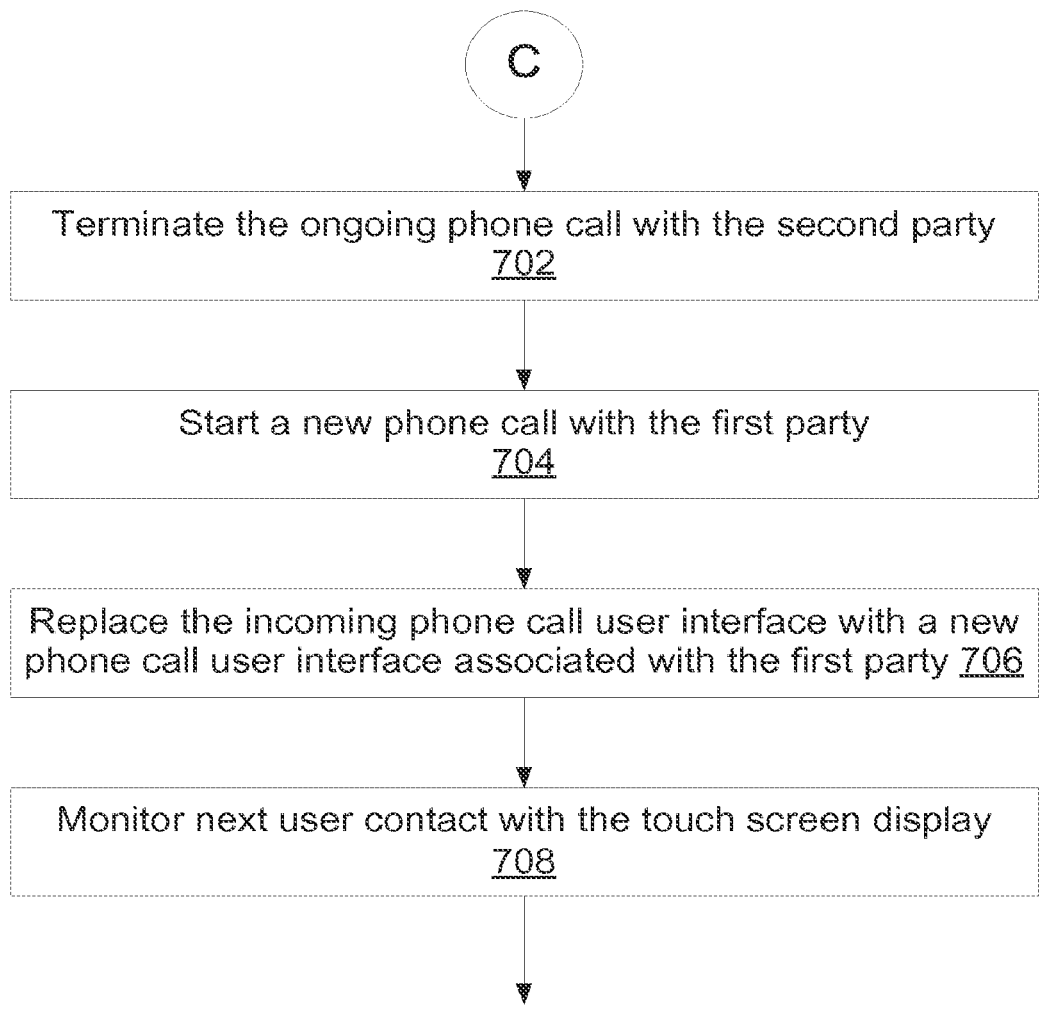
FIG. 7 is a flow diagram illustrating a process for answering an incoming call in accordance with some embodiments.

FIG. 7 is a flow diagram illustrating a process for answering an incoming call after user selection of the "end call+ answer" icon in accordance with some embodiments. Typically, the user selection of the "end call+answer" icon happens after the user notifies the second party of its intention to answer the incoming call. The device 100 first ends the phone call with the second party (702) and then starts the phone call with the first party (704). The incoming phone call user interface 3000C is replaced with a new phone call user interface with the first party (706). An exemplary phone call user interface 3000D is similar to the UI 3000B except that the second party's phone number is replaced by the first party's name "Arlene Bascom." A more detailed description of the UI 3000D is provided below in connection with FIG. 13D. The user starts the conversation with the first user and the device 100 continues monitoring the next user contact with the touch screen display (708). In some embodiments, substantially the same process described above applies when the user is having a conference call with multiple parties, an incoming call arrives, and the user ends the conference call and answers the incoming call.

In some embodiments, the user may choose to answer the incoming call after temporarily suspending (but not completely terminating) the phone call with the second party by selecting the "hold call+answer" icon (510). After conversing with the first party, the user may merge the two separate phone calls—the active call with the first party and the suspended call with the second party—into a conference call so that the three parties can talk with each other simultaneously.

Figure 8:
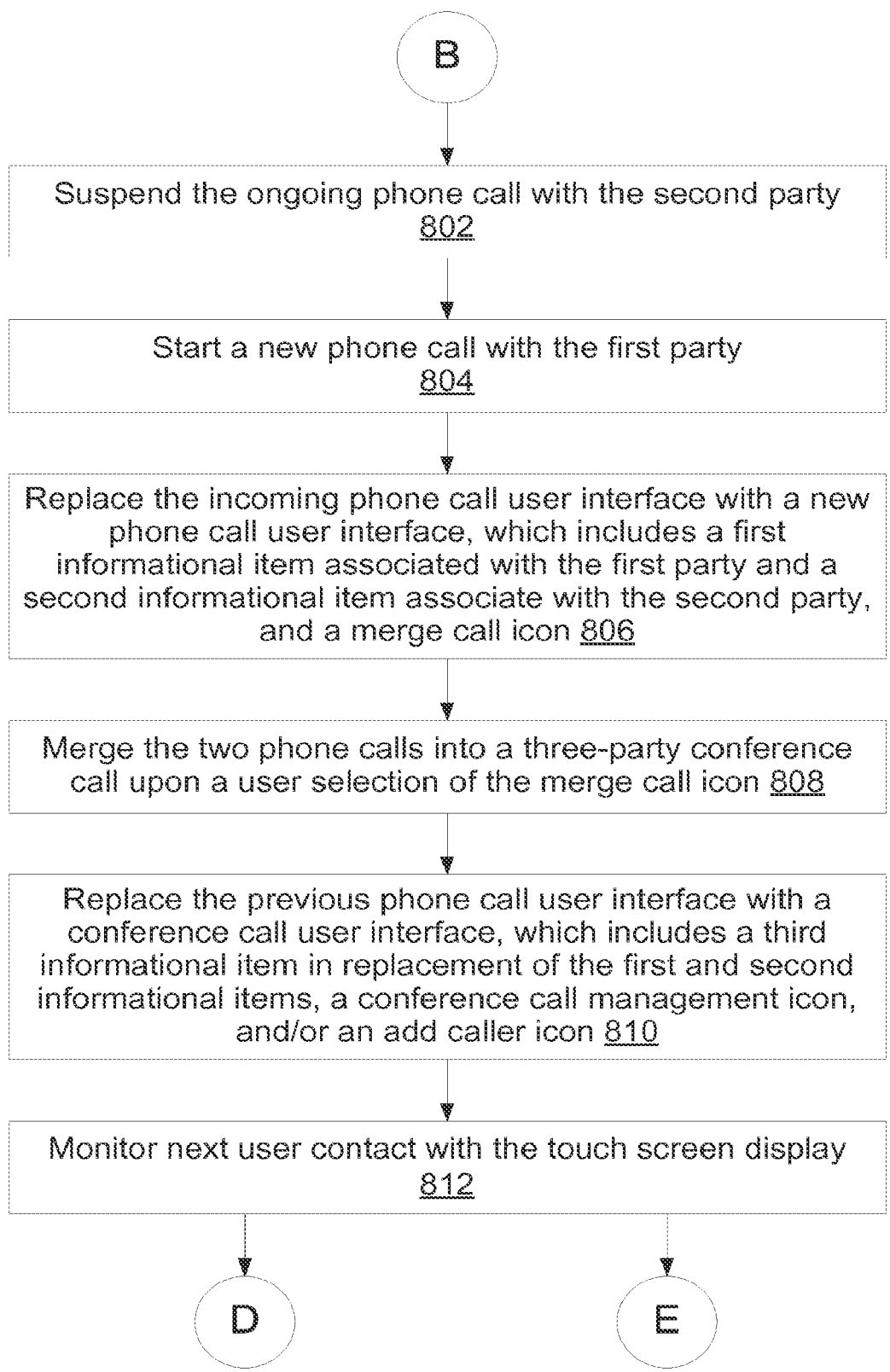
FIG. 8 is a flow diagram illustrating a process for merging two phone calls into a conference call in accordance with some embodiments.

FIG. 8 is a flow diagram illustrating a process for merging two phone calls into a conference call in accordance with some embodiments. In response to a user selection of the "hold call+answer" icon, the device 100 first suspends the phone call with the second party (802) and then activates the phone call with the first party (804). The incoming phone call user interface is replaced with a new phone call interface (806). In some embodiments, the new phone call user interface includes a first informational item corresponding to the active phone call with the first party, a second informational item corresponding to the suspended phone call with the second party, and a merge call icon. An exemplary phone call user interface 3000E is shown in FIG. 13E. The position previously occupied by the add caller icon 3018 may now be occupied by the merge call icon 3038.

After talking with the first party while the second party is on hold, the user may decide to get the second party involved in a conference call by a tap or other gesture on the merge call icon. In response, the device 100 merges the two phone calls into a three-party conference call (808). A conference call user interface is displayed on the touch screen display (810) and the device 100 monitors the next user contact with the touch screen display (812). In some embodiments, the conference call user interface includes: a third informational item (e.g., 3042, FIG. 13G) associated with the conference call in replacement of the first and second informational items in the previous phone call user interface, as well as a conference call management icon (e.g., 3044, FIG. 13G). In some embodiments, the conference call user interface also displays the add call icon 3018. An exemplary user interface 3000G is shown in FIG. 13G. The third informational item 3042 at the top of the UI 3000G indicates that a conference call of which the user is one participant is in progress. In some embodiments, substantially the same process described above applies when the user is having a conference call with multiple parties, an incoming call arrives, and the user suspends the conference call, answers the incoming call and then merges the incoming call with the conference call.

In some embodiments, in addition to merging separate calls (which may include a conference call) into a new conference call, the user may also be able to remove a party from the conference call or temporarily convert the conference call into a private call with a particular patty by selecting a conference call management icon and using a conference call management user interface.

Figure 9:
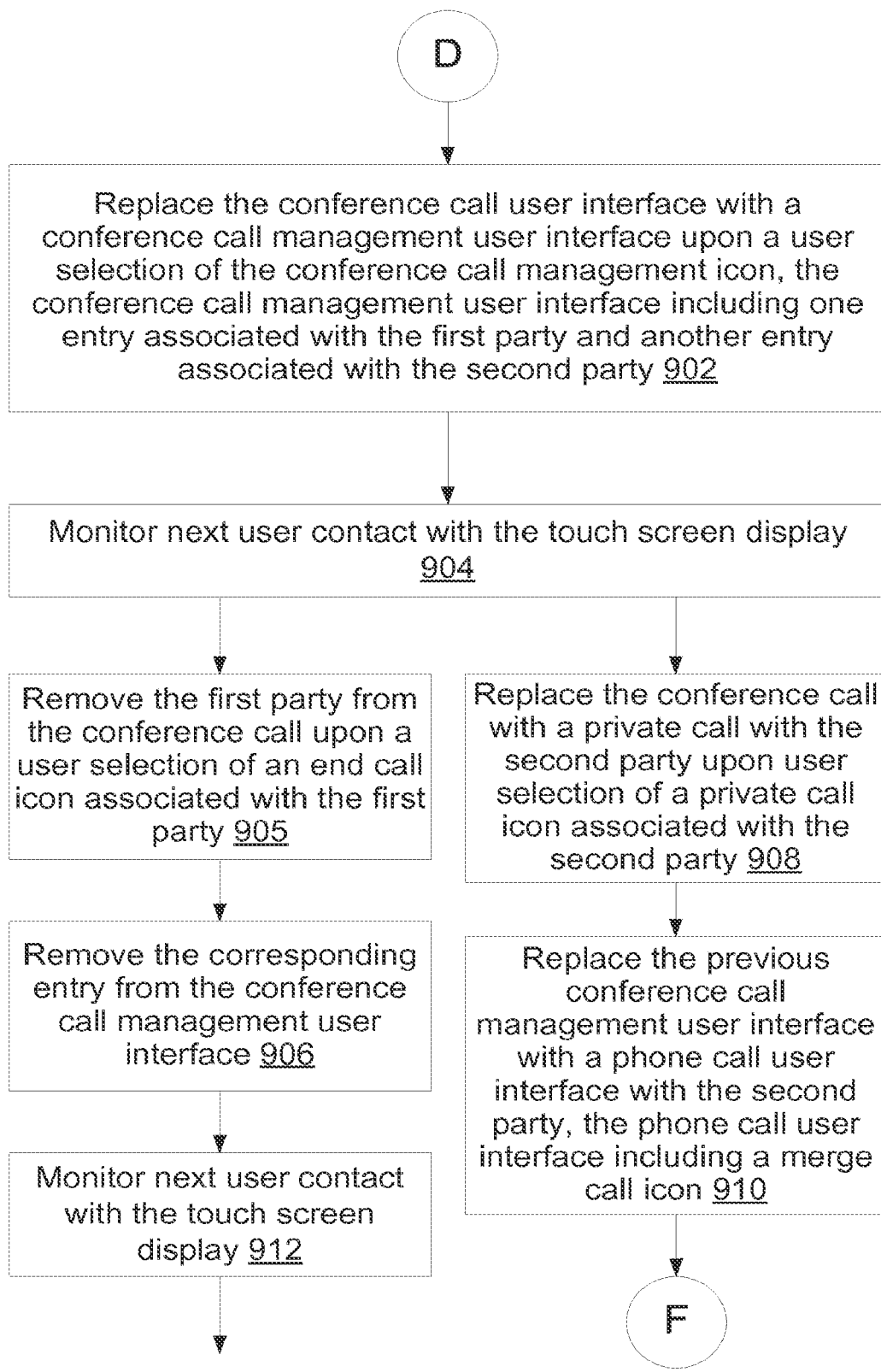
FIG. 9 is a flow diagram illustrating a process for managing a conference call through a conference call management user interface in accordance with some embodiments.

FIG. 9 is a flow diagram illustrating a process for managing a conference call through a conference call management user interface in accordance with some embodiments. Upon detecting a user selection of the conference call management icon, the device 100 replaces the conference call user interface with a conference call management user interface (902). In some embodiments, the conference call management user interface includes one entry associated with the first party, another entry associated with the second party, and so on for each party (other than the user) in the conference call. In some embodiments, each entry has an end call icon and a private call icon. In some embodiments (not shown), a single end call icon and a single private call icon are associated with an entry when the entry is highlighted in the conference call management user interface. An exemplary conference call management user interface 3000H is shown in FIG. 13H. Note that the conference call among the three or more parties is not affected by the user interface change from the conference call user interface to the conference call management user interface on the device's touch screen display.

The device 100 monitors the next user contact with the touch screen display (904). For example, in response to a user selection of the end call icon associated with the first party, the device 100 drops the first party from the conference call (905) and the corresponding entry from the conference call management user interface (906). Note that the device 100 may perform the two operations 905 and 906 in a different order. In some embodiments, the device first displays a confirmation icon on the touch screen display in response to the user selection of the end call icon associated with the first party and then removes the first party and the corresponding management entry from the conference call management user interface after a user selection of the confirmation icon. If the user, the first party, and the second party were the only participants in the conference call, the conference call becomes a private phone call between the user and the second party. The device then monitors the next user contact with the touch screen display (912). In some embodiments, the device 100 also replaces the conference call user interface with the phone call user interface 3000B.

In some embodiments, upon detecting a user selection of the private call icon of the management entry associated with the second party, the device 100 suspends the conference call and replaces it with a private call between the user and the second party (908). The conference call management user interface is replaced with a phone call user interface that has a merge call icon (910). In some embodiments, the phone call user interface includes a fourth informational item associated with the suspended phone call between the user and the first party, a fifth informational item associated with the active phone call between the user and the second party, and a merge call icon. An exemplary user interface 3000J is shown in FIG. 13J. The UI 3000J is the same as the UI 3000E icon except that the informational item associated with the first party "Arlene Bascom" is now grayed out (indicating that Arlen Bascom is on hold) and the informational item associated with the second party "(650) 132-2234" is highlighted (indicating that the user is having a separate call with (650) 132-2234).

As noted above, the user selection of a private call icon merely suspends the conference call. The user can resume the conference call by hitting the merge call icon.

Figure 10:
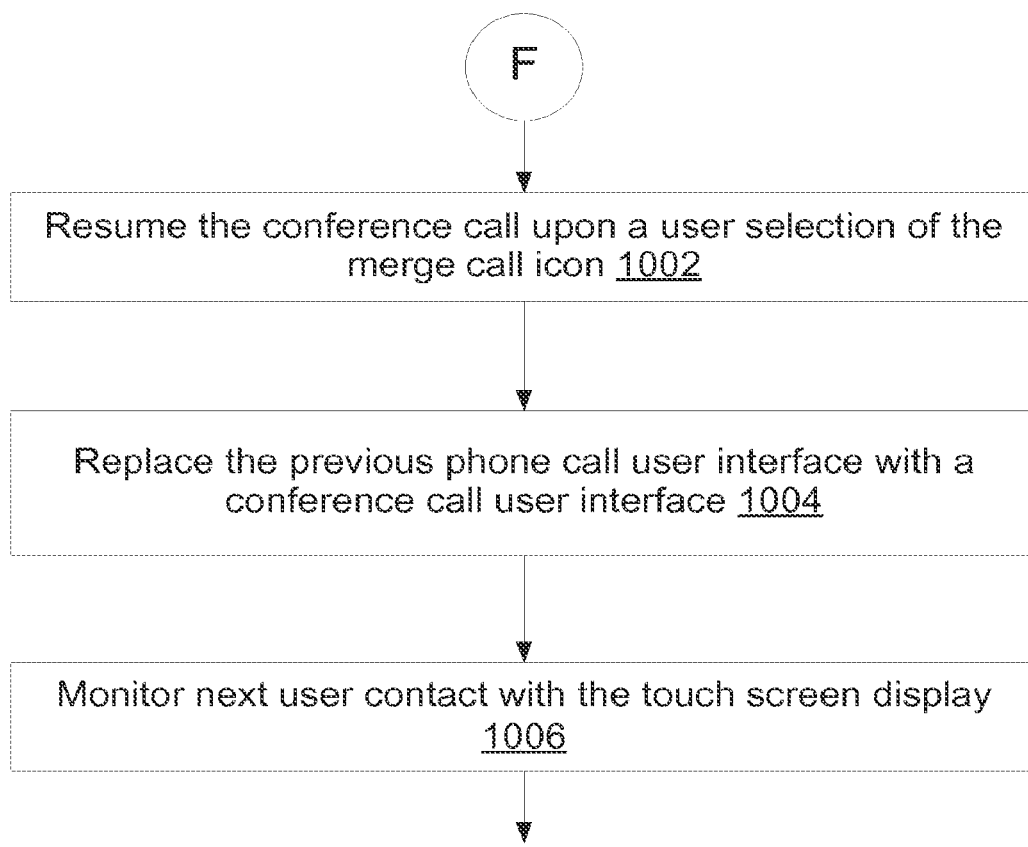
FIG. 10 is a flow diagram illustrating a process for resuming a suspended conference call in accordance with some embodiments.

FIG. 10 is a flow diagram illustrating a process for resuming a suspended conference call in accordance with some embodiments. In response to a user selection of the merge call icon, the device resumes the conference call (1002) and replaces the previous phone call user interface with a conference call user interface (1004). An exemplary conference call user interface 3000G is shown in FIG. 13G. The device 100 monitors the next user contact with the touch screen display (1006).

As noted above, a conference call may be formed by merging an existing phone call with an incoming call or an outgoing call. The existing call itself may be a phone call between two individual parties or a conference call among three or more parties.

The user may choose to add a new party to an existing conference call by selecting the add call icon (e.g., 3018, FIG. 13G). In some embodiments, adding a caller to a conference call involves: suspending the conference call; starting a new phone call with the new party; and merging the suspended conference call and the new call into a conference call that includes the new party.

Figure 11:
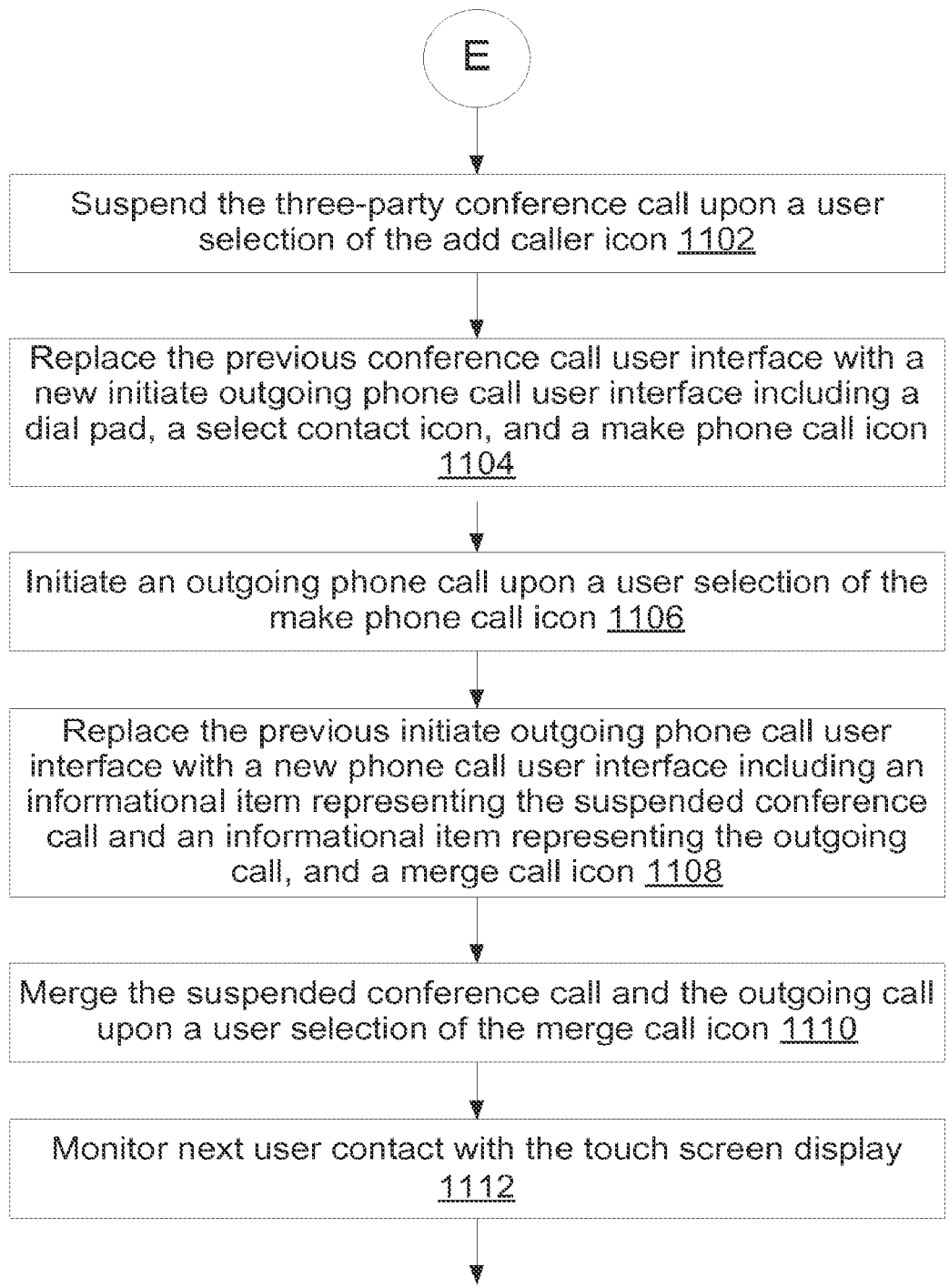
FIG. 11 is a flow diagram illustrating a process for suspending a conference call and initiating an outgoing call in accordance with some embodiments.

FIG. 11 is a flow diagram illustrating a process for suspending a conference call and initiating an outgoing call in accordance with some embodiments. In response to the user selection of the add caller icon, the device suspends the existing three-party conference call (1102). The device 100 replaces the conference call user interface with an initiate outgoing phone call user interface (1104). In some embodiments, the initiate outgoing phone call user interface includes a dial pad, a select contact icon, and/or a make phone call icon (e.g., UI 2900 in FIG. 12 includes a dial pad 2902 and a make phone call icon 2906). A user selection of a contact list entry or a user-keyed telephone number followed by a user selection of the make phone call icon initiates an outgoing call to the user-selected party (1106).

If the user-selected party answers the call, the device 100 replaces the initiate outgoing call user interface with a new phone call user interface (1108). The new phone call user interface includes: an informational item associated with the suspended conference call, another informational item representing the new outgoing call, and a merge call icon. The device 100 merges the two phone calls into a new conference call in response to a user selection of the merge call icon (1110) and monitors the next user contact with the touch screen display (1112).

Figure 13A:
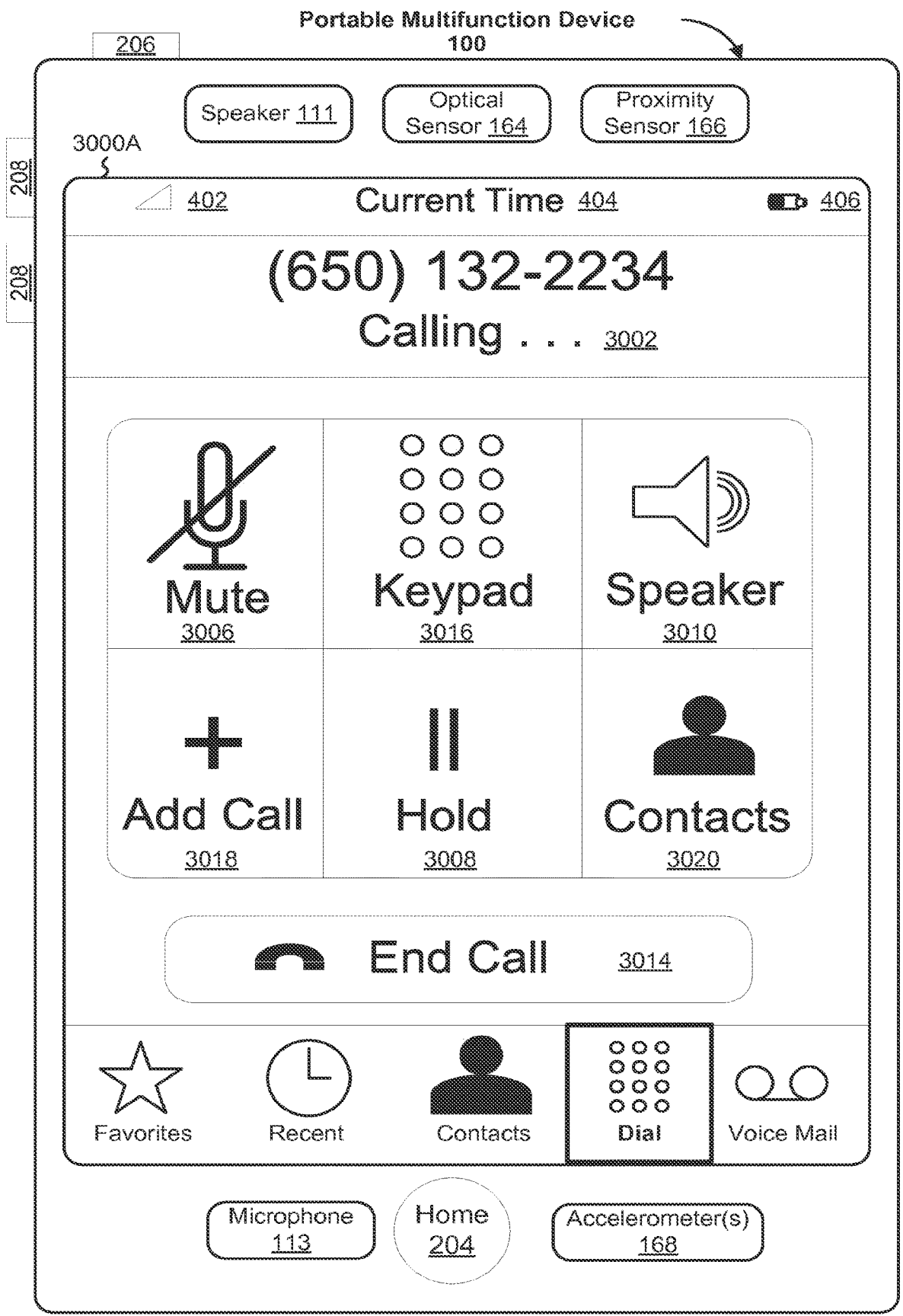
FIGS. 13A-13P illustrate exemplary user interfaces displayed during a call in accordance with some embodiments.
Figure 13B:
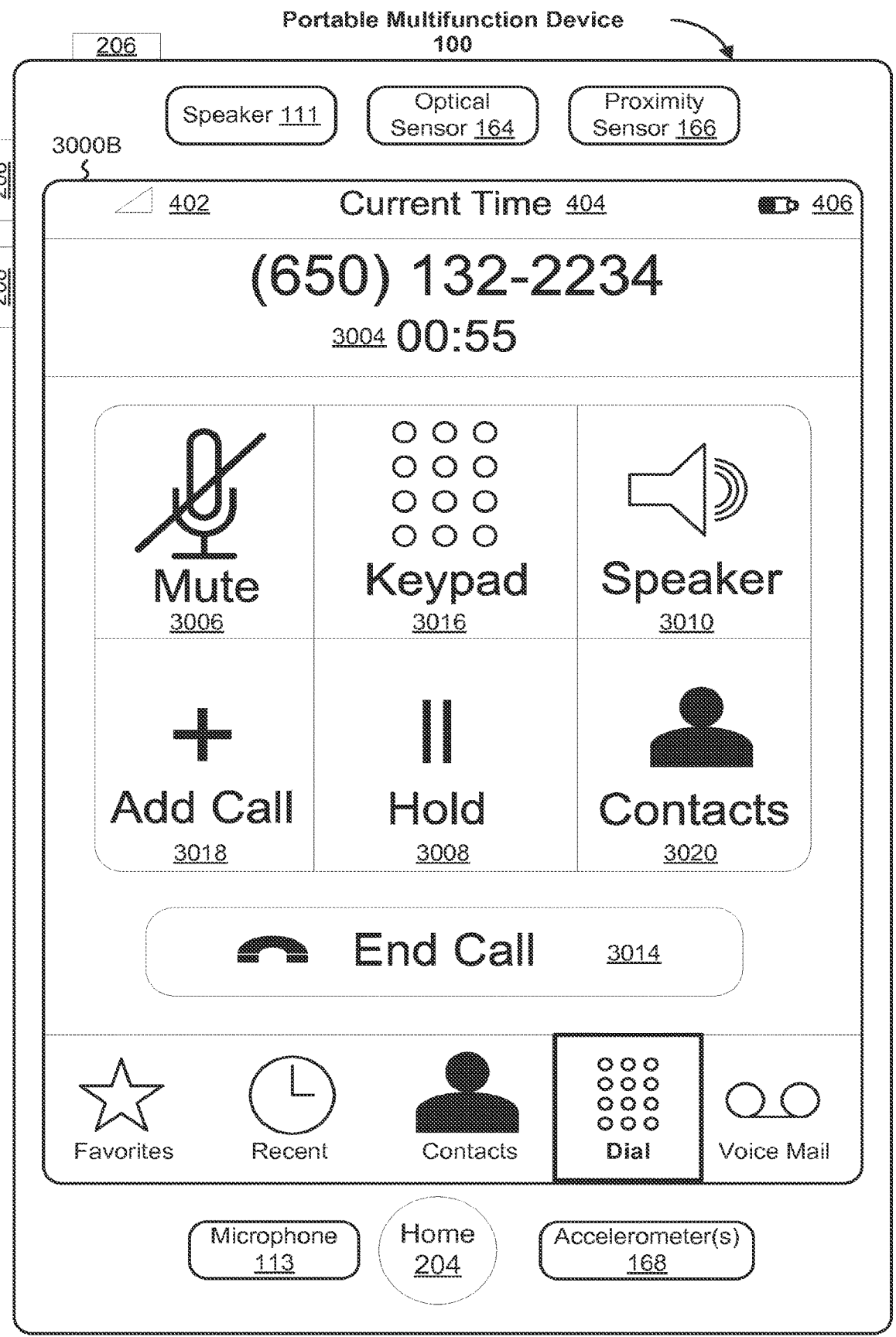
Figure 13C:
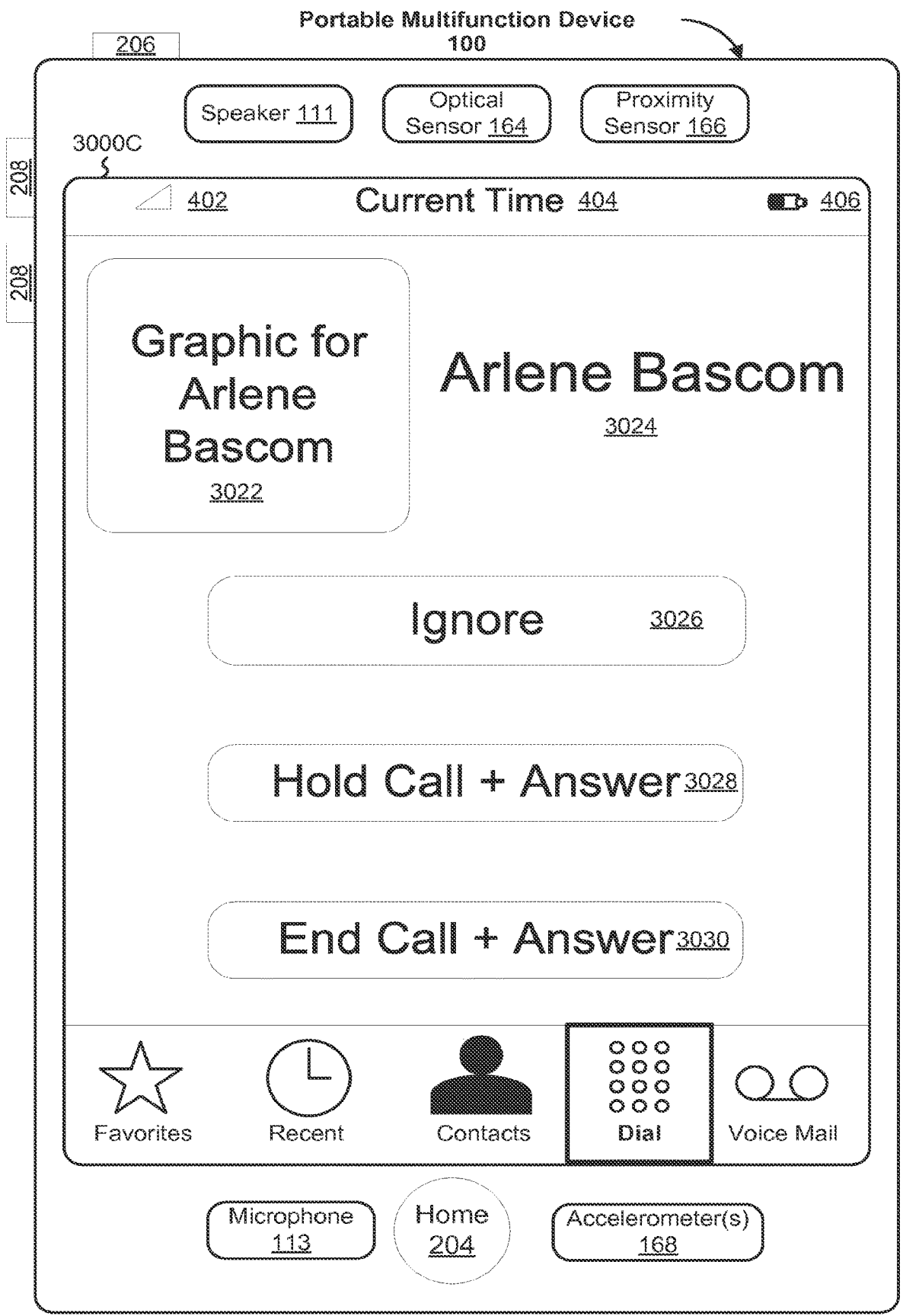
Figure 13D:
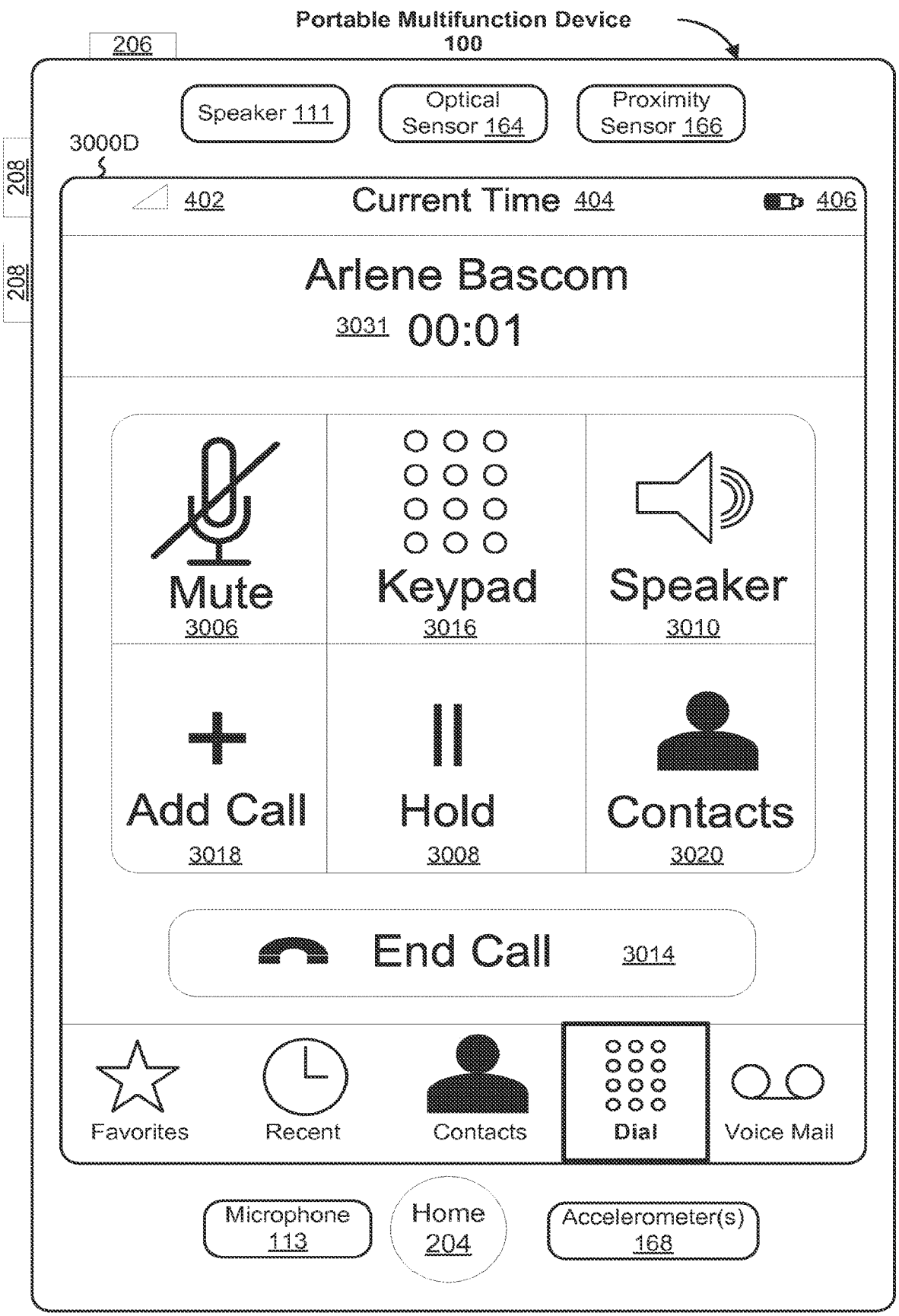
Figure 13E:
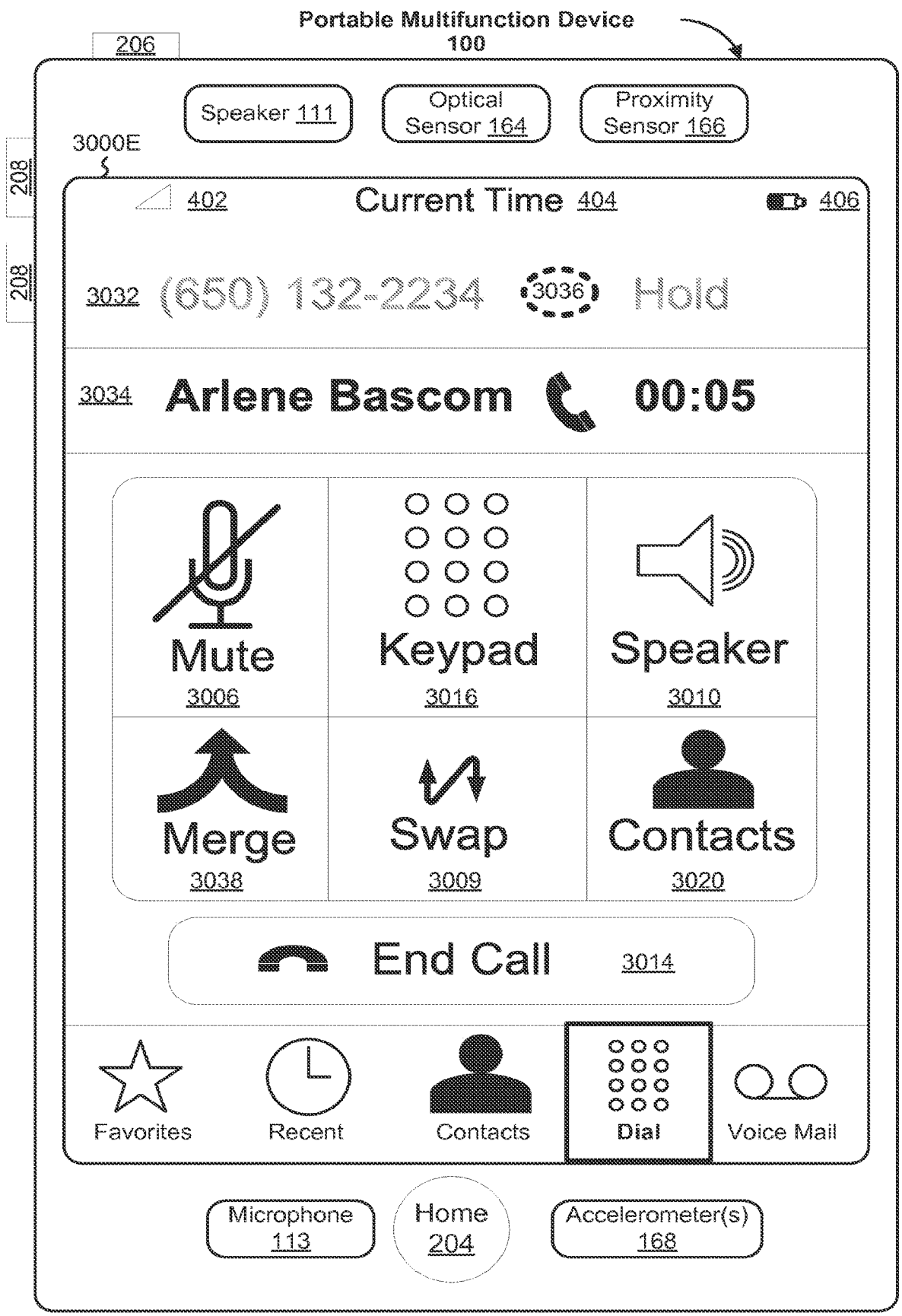
Figure 13F:
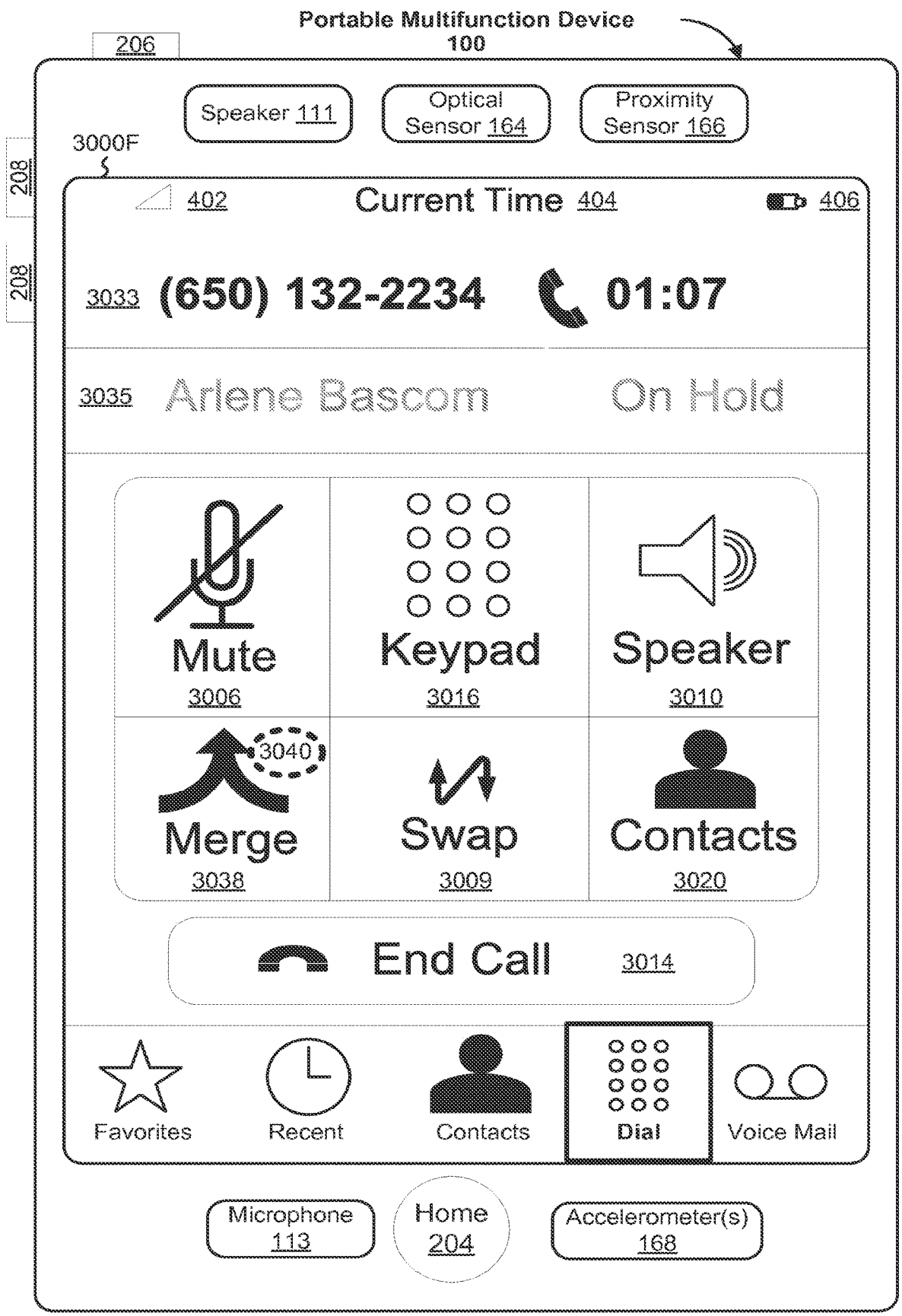
Figure 13G:
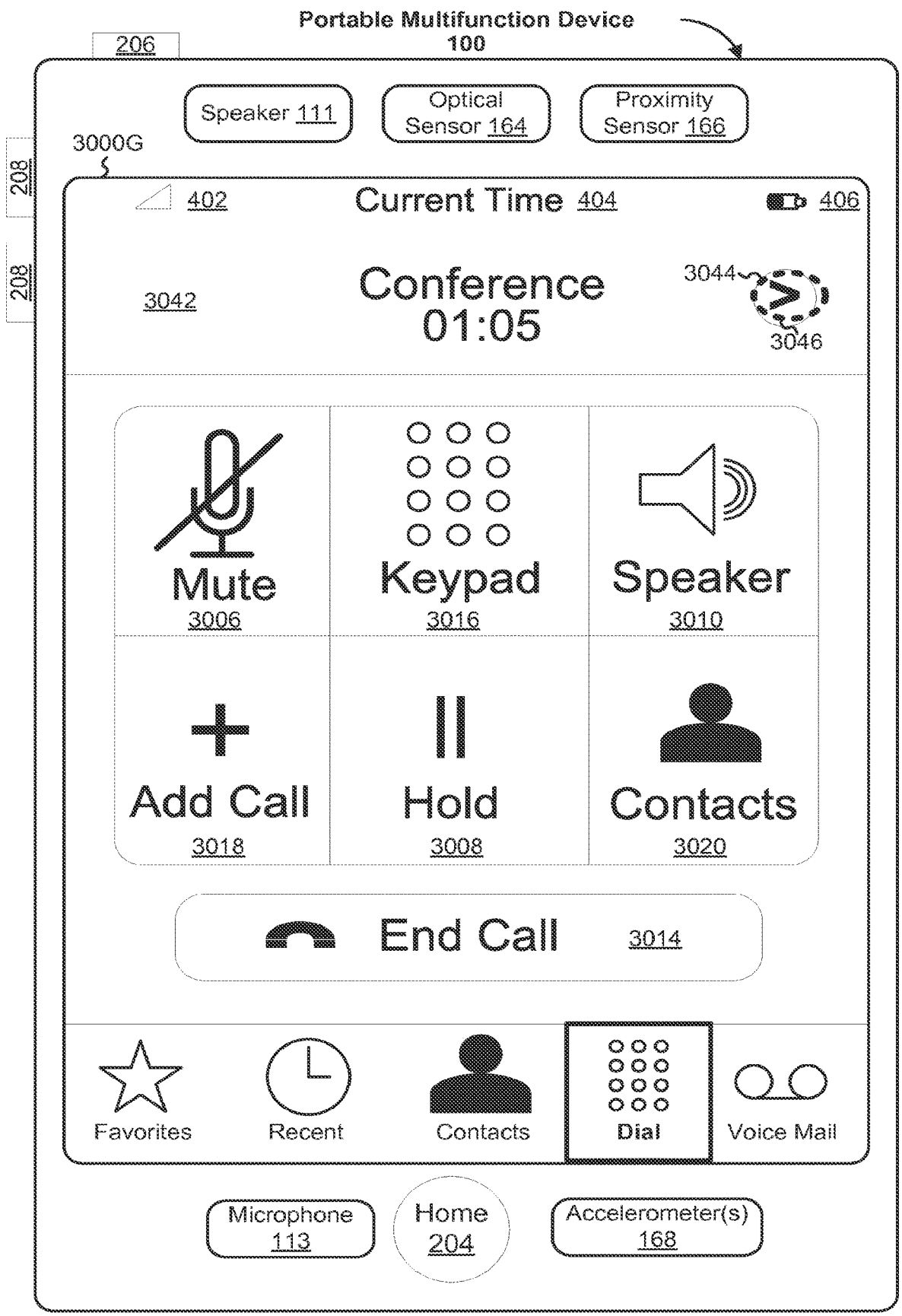
Figure 13H:
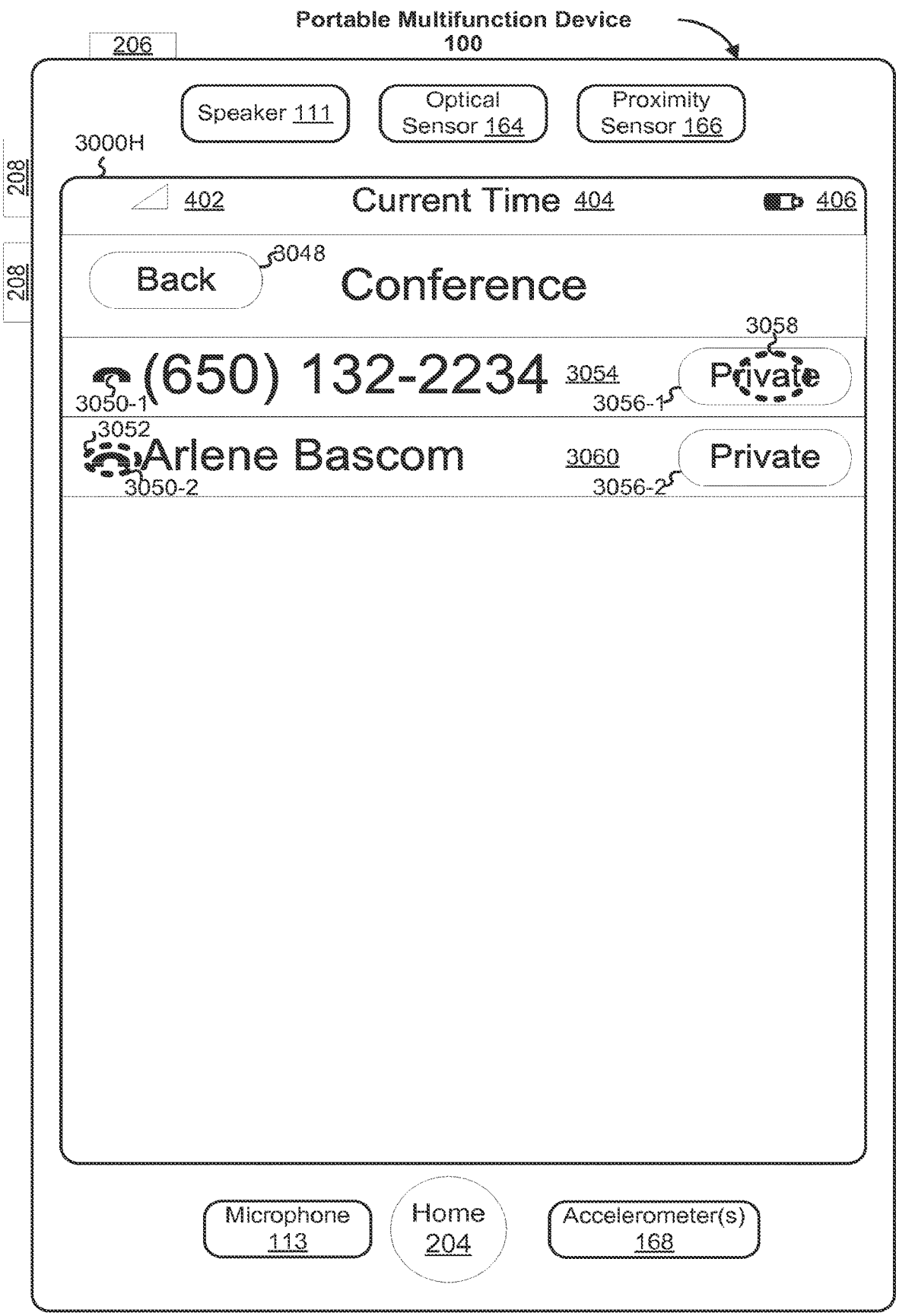
Figure 13I:
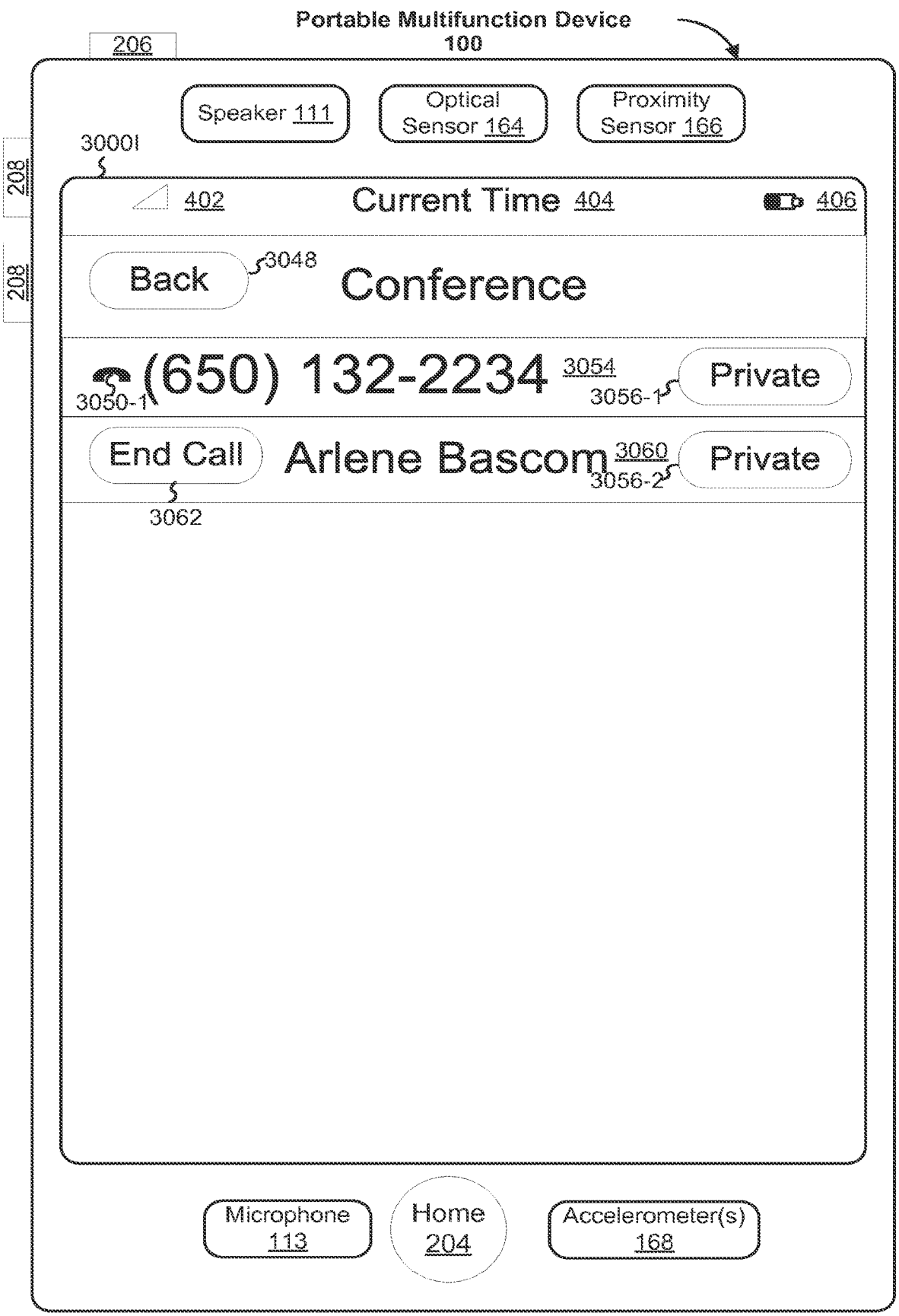
Figure 13J:
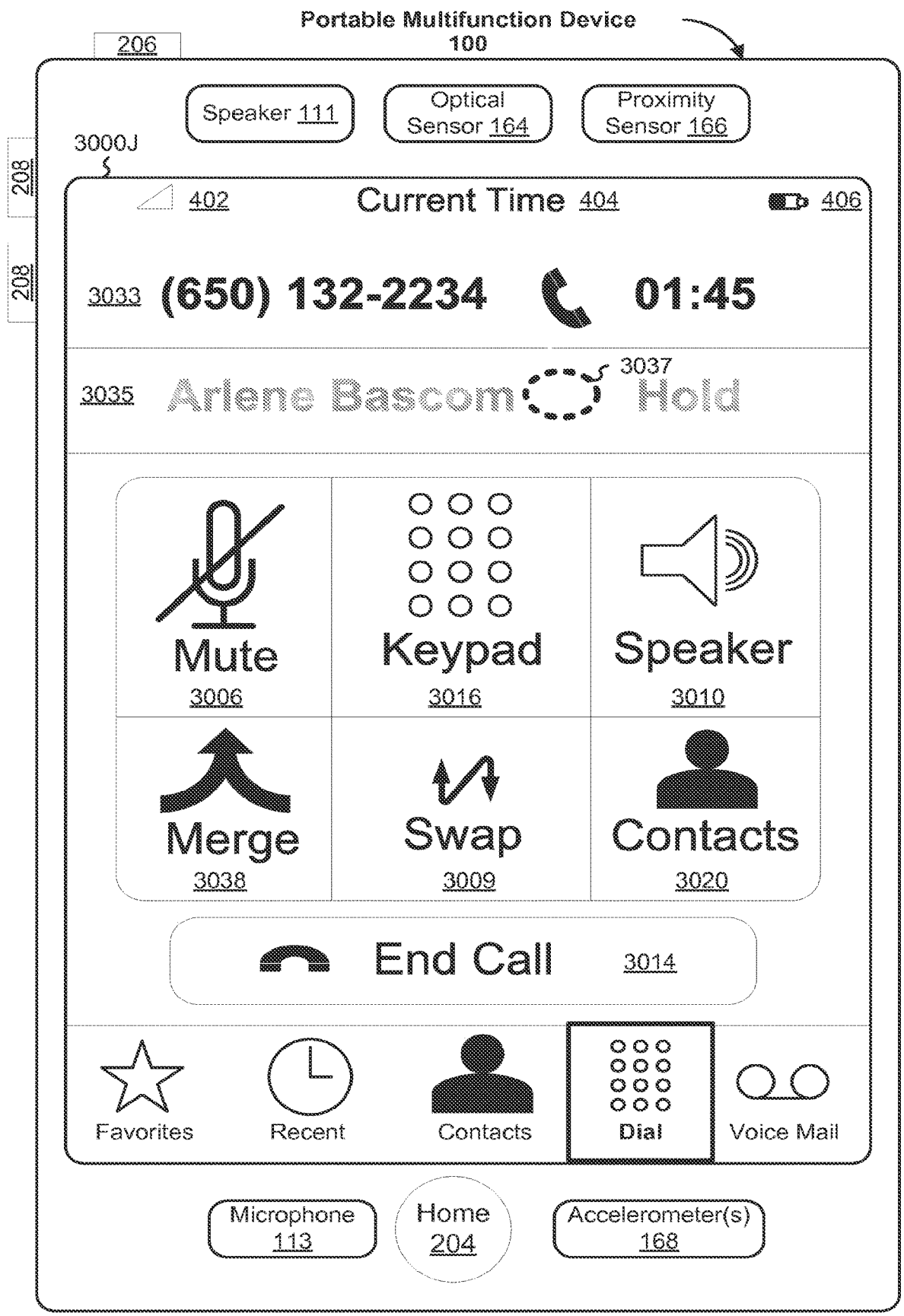
Figure 13K:
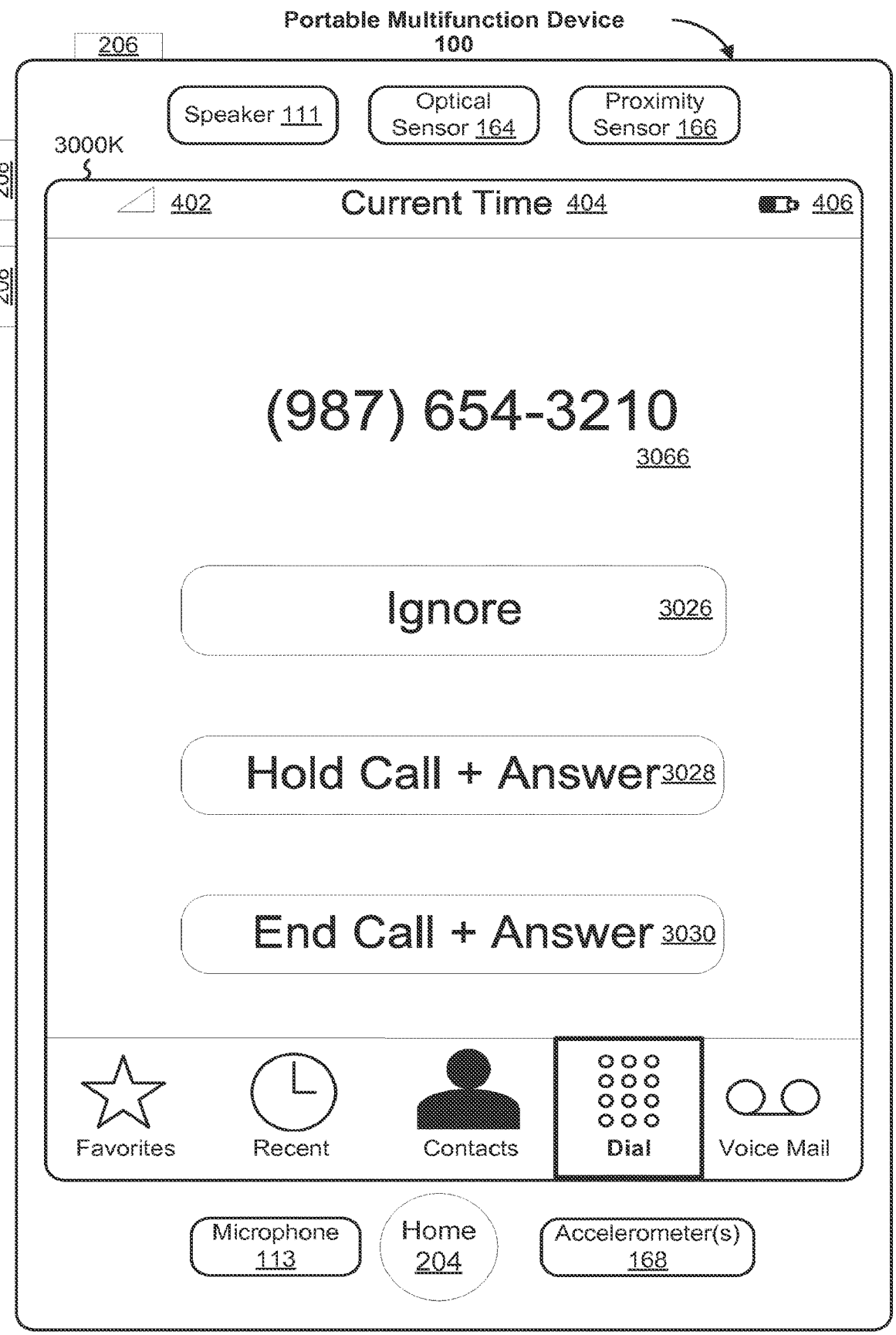
Figure 13L:
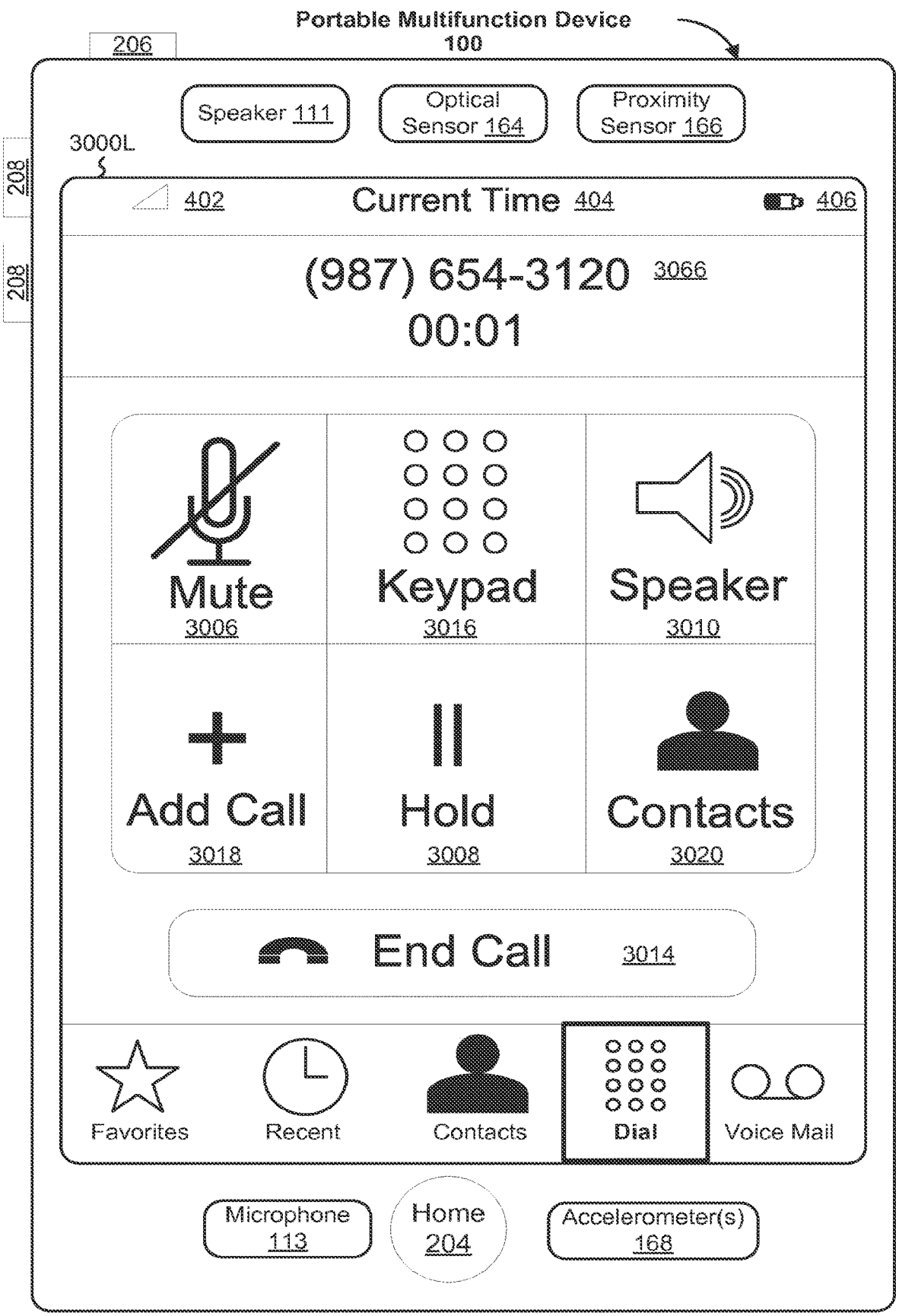
Figure 13M:
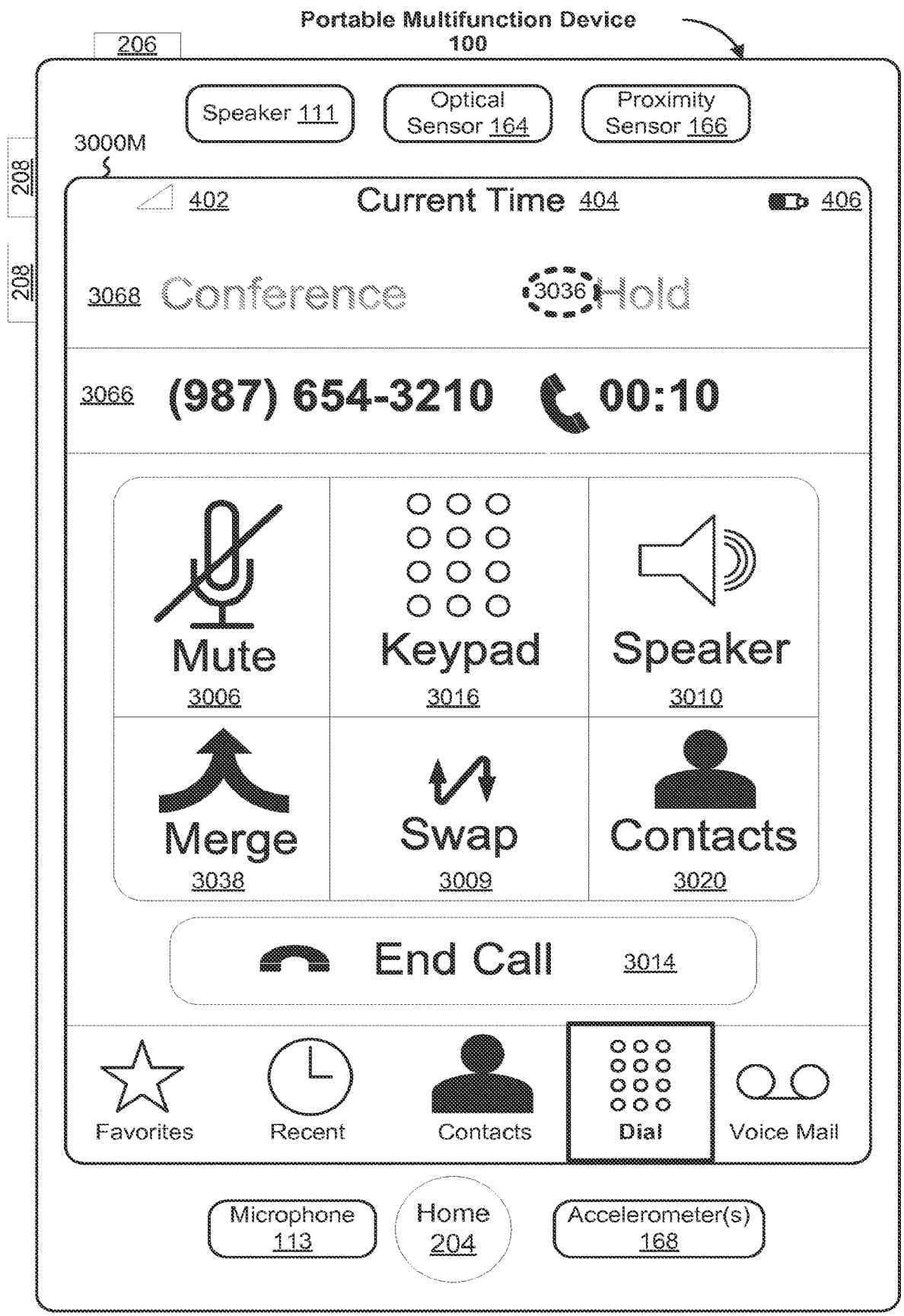
Figure 13N:
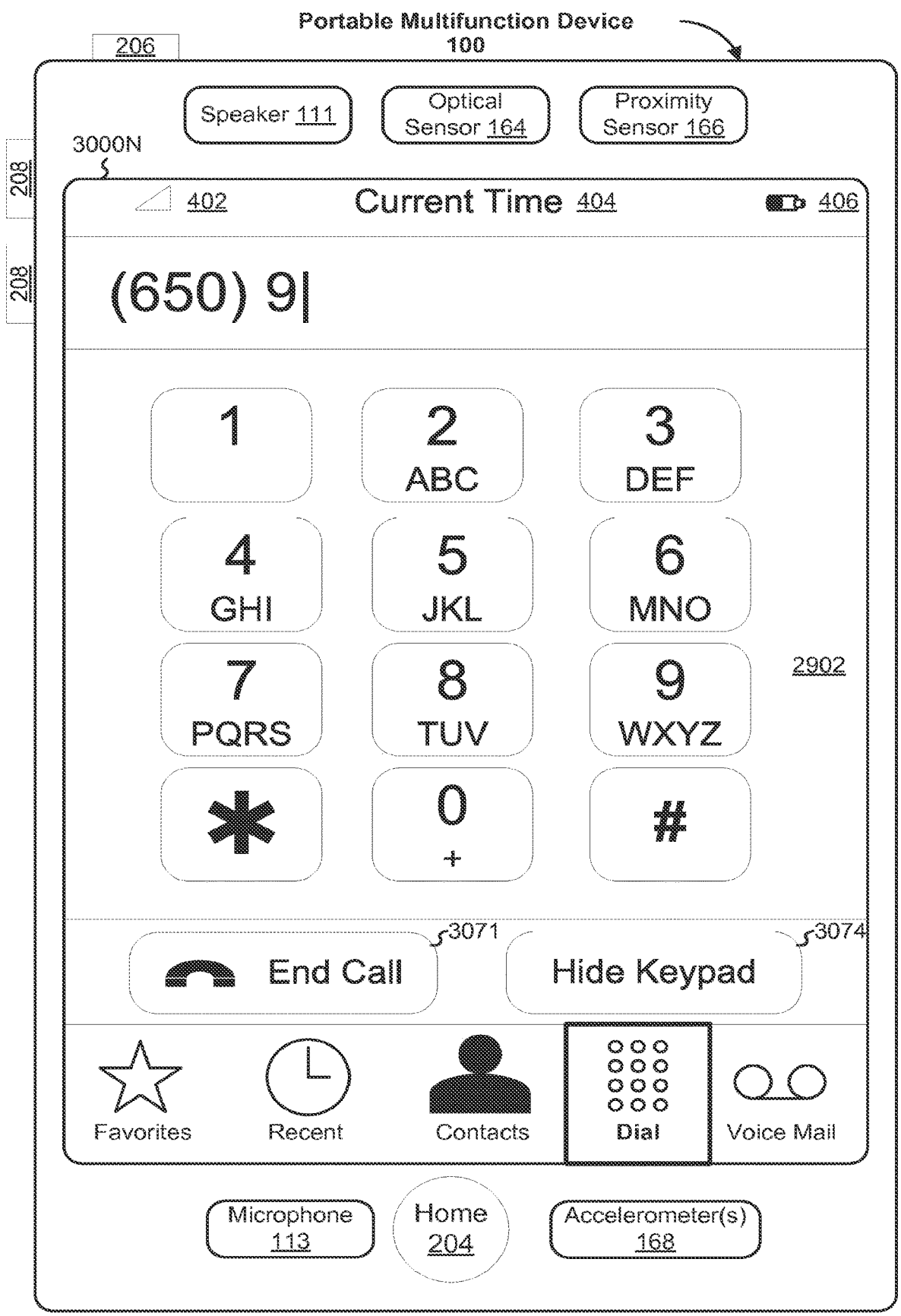
Figure 13O:
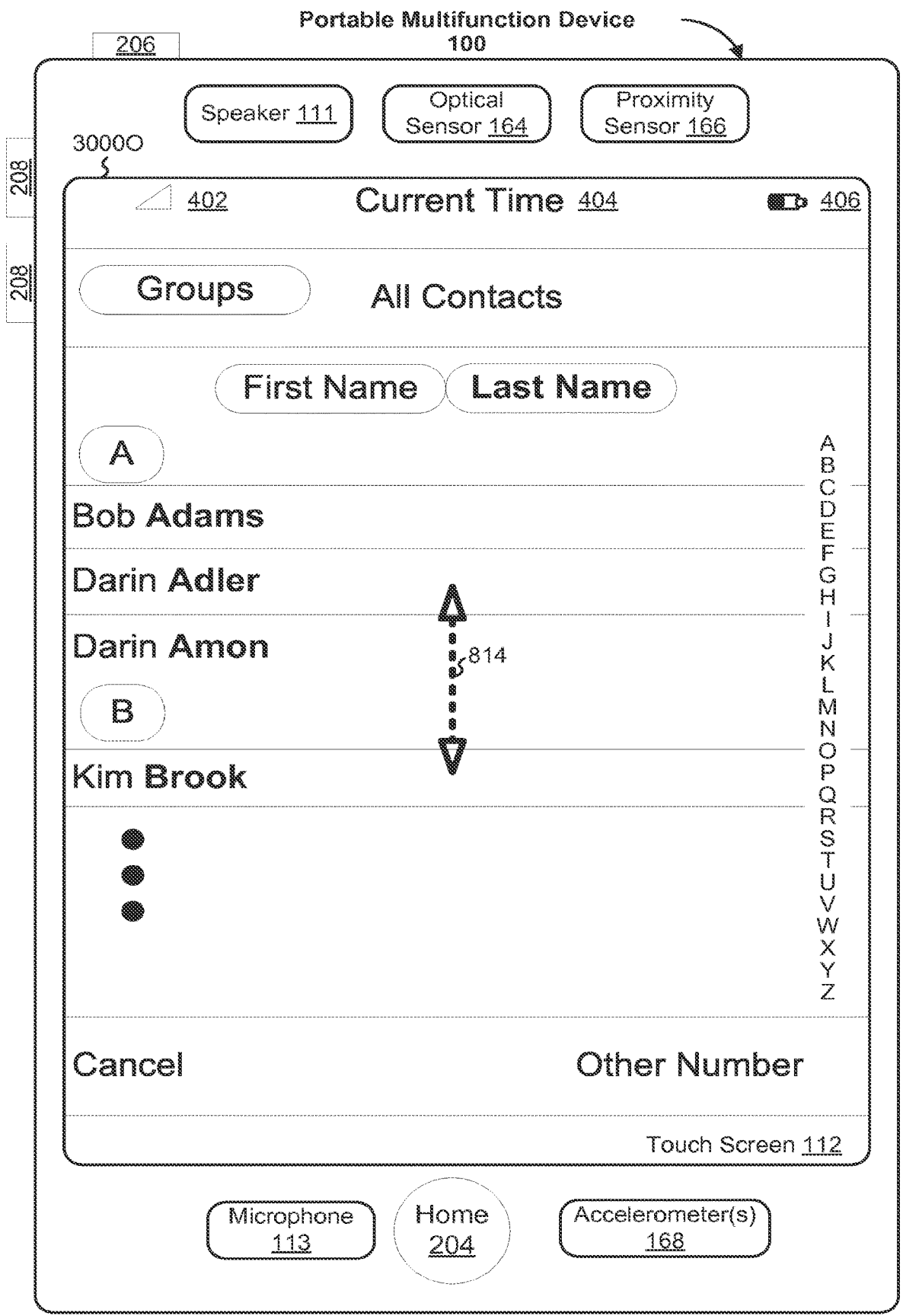
Figure 13P:
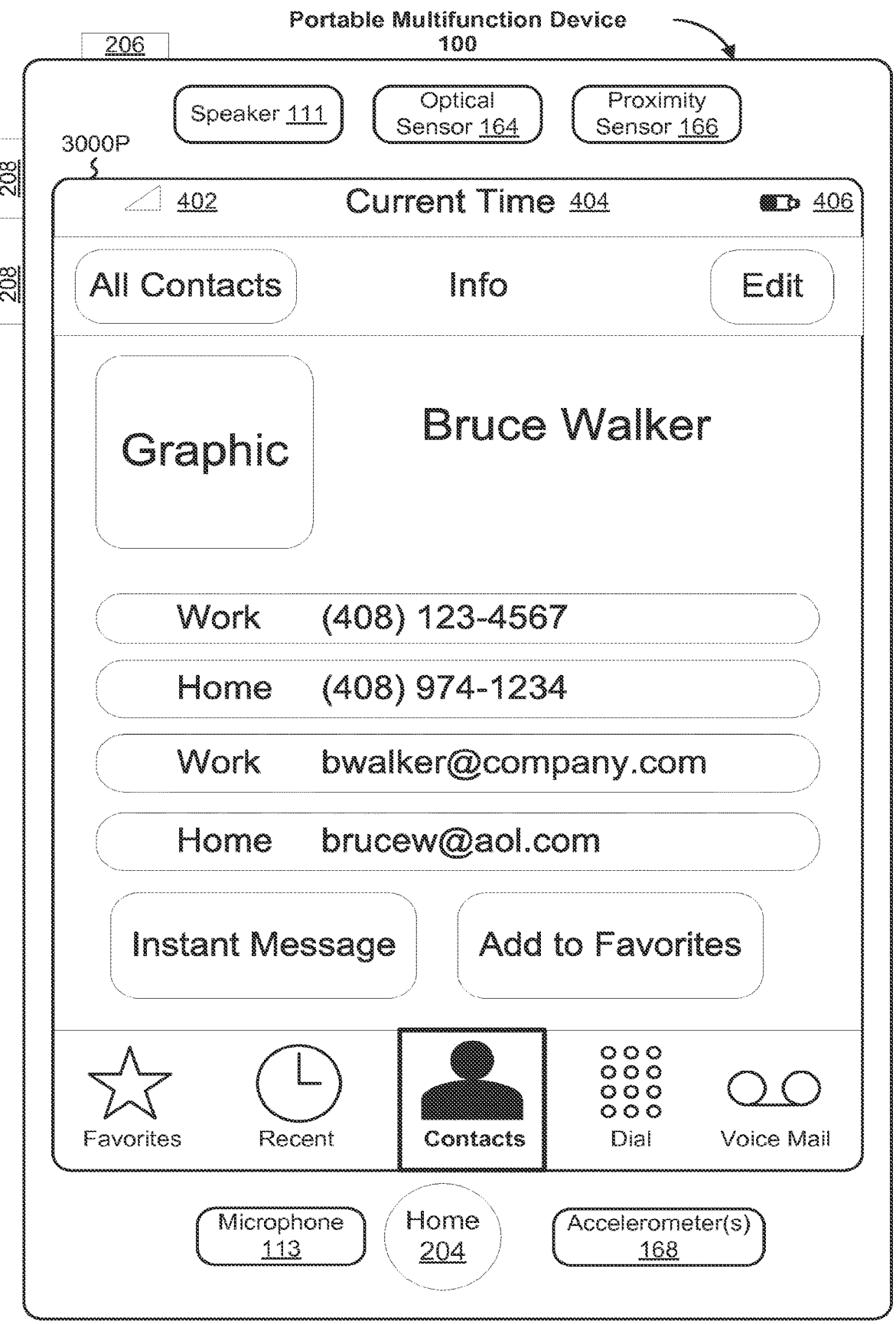

FIGS. 13A-13P illustrate exemplary user interfaces displayed during a call in accordance with some embodiments. In some embodiments, a UI indicates that a call is being attempted 3002 (UI 3000A, FIG. 13A) and then indicates the connection time 3004 after the connection is made (UI 3000B, FIG. 13B).

In some embodiments, in response to a tap or other predefined user gesture, the device may: mute the call (e.g., if the gesture is applied to icon 3006); place the call on hold (e.g., if the gesture is applied to icon 3008); swap between two calls, placing one call on hold to continue the other call (e.g., if the gesture is applied to icon 3009); place the call on a speaker (e.g., if the gesture is applied to icon 3010); add a call (e.g., if the gesture is applied to icon 3018); display a numeric keypad for number entry (e.g., if the gesture is applied to icon 3016, UI 3000N in FIG. 13N is displayed); display the user's contact list (e.g., if the gesture is applied to icon 3020); or end the call (e.g., if the gesture is applied to icon 3014).

In some embodiments, if the device receives an incoming call while the user is on another call (e.g., with someone at (650) 132-2234 in FIG. 13B), then an incoming call UI is displayed, such as UI 3000C (FIG. 13C) for a known caller (e.g., Arlene Brown 3024, an entry in the user's contact list) or UI 3000K (FIG. 13K) for an unknown caller. In some embodiments, the incoming call UI includes icons which, when activated by a user tap or other gesture, cause the device to: (1) terminate the incoming call or send the caller to voice mail (e.g., ignore icon 3026); (2) place the current call on hold and answer the incoming call (e.g., hold+answer icon 3028); and/or (3) end the current call and answer the incoming call (e.g., end+answer icon 3030).

In this example, in response to activation of the end+ answer icon 3030 (e.g., by a finger tap on the icon), the call with (650) 132-2234 is ended, the call front Arlene Bascom is answered, and phone call UI 3000D (FIG. 13D) is displayed, which includes information 3031 identifying the caller (Arlene Bascom).

In this example, in response to activation of the hold+ answer icon 3028 (e.g., by a finger tap on the icon), the call with (650) 132-2234 is put on hold, the call from Arlene Bascom is answered, and phone call UI 3000E (FIG. 13E) is displayed, which includes information 3034 identifying the caller (Arlene Bascom) and information 3032 indicating that the other call is suspended. In some embodiments, in response to a user gesture on the information 3032 indicating that the other call is on hold (e.g., a finger tap 3036), the active call is suspended, the suspended call is made active, and phone call UI 3000F is displayed, which includes information 3033 and 3035 indicating the status of the two calls.

In some embodiments, if the merge icon 3038 (FIG. 13E or 13F) is activated (e.g., by a finger tap 3040 on the icon), the active call and the call on hold are merged into a conference call and a conference call UI is displayed (e.g., UI 3000G, FIG. 13G). The conference call UI includes information 3042 about the conference call and a conference call management icon 3044.

In some embodiments, in response to activation of the conference call management icon 3044 (e.g., by a finger tap 3046 on the icon), a conference call management UI is displayed (e.g., UI 3000H, FIG. 13H). In some embodiments, the conference calf management UI includes an end call icon 3050 and a private call icon 3056 for each entry in the conference call management UI. In some embodiments (not shown), the conference call management UI includes an end call icon and a private call icon that are associated with an entry when the entry is highlighted in the conference call management UI. In some embodiments, in response to activation of the end call icon 3050 (e.g., by a finger tap 3052 on the icon), a confirmation icon is displayed (e.g., end call icon 3062, FIG. 13I) to prevent accidental deletion of a party to the conference call.

In some embodiments, in response to activation of the private call icon 3056 (e.g., by a finger tap 3058 on the icon), the conference call is suspended and a phone call UI is displayed (e.g., UI 3000J, FIG. 13J), which includes information 3033 about the private call and information 3035 about the suspended conference call. In this example, because only one other party in the conference call is on hold (Arlene Bascom in this example), the information 3035 about the suspended conference call is just information about the one party on hold. In some embodiments, if more than one party in the conference call is put on hold, then the information 3035 about the suspended conference call may be less specific, such as "conference on hold" or the like (e.g., information 3068 in UI 3000M, FIG. 13M).

If an incoming call is not from a caller known to the user (e.g. the phone number is not in the user's contact list), then an incoming call UI such as UI 3000K (FIG. 13K) is displayed, rather than an incoming call UI such as UI 3000C (FIG. 13C) with the caller's name 3024 and/or associated image 3022.

In some embodiments, in response to activation of the add call icon 3018 (e.g., by a finger tap on the icon in FIG. 13B, 13D, or 13G), the user's contact list is displayed (UI 3000O, FIG. 13O), which typically includes a plurality of entries that correspond to a plurality of third parties. In some embodiments, in response to activation of an entry of a third party in the contact list (e.g., by a finger tap on the entry), an outgoing phone call is initiated to the third party if there is only one phone number associated with the entry. If there is more than one phone number associated with the entry, these numbers are displayed (e.g., UI 3000P, FIG. 13P displays two phone numbers associated with one entry for Bruce Walker). In response to user selection of one of these numbers (e.g., by a finger tap on the desired number for the third party), an outgoing phone call is initiated. In some embodiments, in response to activation of an entry of a third party in the contact list (e.g., by a finger tap on the entry), the information for the corresponding entry is displayed independent of the number of phone numbers associated with the entry and, in response to user selection of a phone number in the entry, an outgoing phone call is initiated to the third party.

In some embodiments, in response to activation of the keypad icon 3016 (e.g., by a finger tap on the icon), a keypad UI for entering digits during a call is displayed (e.g., UI 3000N, FIG. 13N), which includes a dial pad 2902, a hide keypad icon 3074, and a make call icon 3071. In some embodiments, in response to activation of icon 3074 (e.g., by a finger tap or other gesture on the icon), the UI that was being displayed immediately prior to the display of the keypad UI is displayed again.

Creating a Conference Call from Two Existing Calls

In some embodiments, the device 100 displays a phone call user interface (e.g., UI 3000E, FIG. 13E) on the touch screen display. The phone call user interface includes a first informational item associated with an active phone call between a user of the device and a first party (e.g., 3034), a second informational item associated with a suspended phone call between the user and a second party (e.g., 3032), and a merge call icon (e.g., 3038).

Upon detecting a user selection of the merge call icon, (1) the active phone call and the suspended phone call are merged into a conference call between the user, the first party, and the second party; and (2) the phone call user interface is replaced with a conference call user interface (e.g., UI 3000G, FIG. 13G). The conference call user interface includes: a third informational item associated with the conference call (e.g., 3042) in replacement of the first and second informational items, and a conference call management icon (e.g., 3044).

Managing a Conference Call

In some embodiments, upon detecting a user selection (e.g., gesture 3046) of the conference call management icon 3044, the conference call user interface (e.g., UI 3000G) is replaced with a conference call management user interface (e.g., UI 3000H, FIG. 13H). The conference call management user interface includes a first management entry corresponding to the first party (e.g., 3060) and a second management entry corresponding to the second party (e.g., 3054), each management entry including an end call icon (e.g., 3050) and a private call icon (e.g., 3056), and a back (or previous screen) icon (e.g., 3048). If additional parties were also participating in the conference call (e.g., by a user adding caller(s) and then merging the added caller(s)), then management entries for these additional parties would also appear in the conference call management user interface (e.g., UI 3000H, FIG. 13H). In some embodiments, its discussed above, rather than having an end call icon and a private call icon as part of each management entry, an end call icon and a private call icon are associated with a respective management entry when the respective management entry is highlighted in the conference call management user interface (e.g. by enlarging, bolding, or changing the shading of the respective management entry). In these embodiments, upon detecting user selection of the end call icon, the party corresponding to the highlighted, respective management entry is removed from the conference call, with or without confirmation. Similarly, in these embodiments, upon detecting user selection of the private call icon, the conference call is suspended and a private call is initiated with the party corresponding to the highlighted, respective management entry.

In some embodiments, upon detecting a user selection (e.g., gesture 3052) of the end call icon in the first management entry, a confirmation icon (e.g., 3062, FIG. 1300I) is displayed on the touch screen display. Upon detecting a user selection of the confirmation icon, the first party is excluded from the conference call; and the first management entry is removed from the touch screen display.

In some embodiments, upon detecting a user selection (e.g., gesture 3058) of the private call icon in the second management entry, the conference call is suspended and the conference call management user interface is replaced with the phone call user interface (e.g., UI 3000J, FIG. 13J). The phone call user interface includes a fourth informational item associated with a suspended phone call between the user and the first party (e.g., 3035), a fifth informational item associated with an active phone call between the user and the second party (e.g., 3033), and the merge call icon (e.g., 3038).

In some embodiments, the conference call is resumed upon detecting a second user selection of the merge call icon; and the phone call user interface (e.g., UI 3000J, FIG. 13J), including the fourth and fifth informational items, is replaced with the conference calf user interface (e.g., UI 3000G, FIG. 13G).

Receive an Incoming Call During a Conference Call

In some embodiments, upon detecting an incoming phone call from a third party, the conference call user interface or the conference call management user interface (i.e., whichever interface is being displayed when the incoming call is detected) is replaced with an incoming phone call user interface (e.g., UI 3000C, FIG. 13C for a known caller or UI 3000K, FIG. 13K for an unknown caller). The incoming phone call user interface includes an ignore incoming phone call icon (e.g., 3026), a suspend current phone call and answer incoming phone call icon (e.g., 3028), and an end current phone call and answer incoming phone call icon (e.g., 3030).

In some embodiments, upon detecting a user selection of the ignore incoming phone call icon (e.g., 3026), the incoming phone call from the third party is terminated or sent to voice mail; the conference call with the first and second parties is continued; and the incoming phone call user interface is replaced with the conference call user interface or the conference call management user interface (i.e., whichever interface was being displayed when the incoming call was detected).

In some embodiments, upon detecting a user selection of the end current phone call and answer incoming phone call icon (e.g., 3030), the conference call with the first and second parties is terminated; a phone call between the user and the third party is activated; and the incoming phone call user interface is replaced with a phone call user interface (e.g., UI 3000L, FIG. 13L). The phone call user interface includes a sixth informational item associated with the phone call between the user and the third party (e.g., 3066).

In some embodiments, upon detecting a user selection of the suspend current phone call and answer incoming phone call icon (e.g., 3028), the conference call with the first and second parties is suspended; a phone call between the user and the third party is activated; and the incoming phone call user interface is replaced with a phone call user interface (e.g., UI 3000M, FIG. 13M). The phone call user interface includes a sixth informational item associated with the phone call between the user and the third party (e.g., 3066), a seventh informational item associated with the suspended conference call between the user and the first and second parties (e.g., 3068), and a merge call icon (e.g., 3038).

In some embodiments, upon detecting a user selection of the suspend current phone call and answer incoming phone call icon, a phone call between the user and the third party is activated and the incoming phone call user interlace is replaced with a phone call user interface (e.g., UI 3000M, FIG. 13M). The phone call user interface includes a sixth informational item associated with the phone call between the user and the third party (e.g., 3066), a seventh informational item associated with the suspended conference call between the user and the first and second parties (e.g., 3068), and a merge call icon (e.g., 3038).

Adding a Caller During a Conference Call

In some embodiments, the conference call user interface includes an add caller icon (e.g., 3018, FIG. 13G). Upon detecting a user selection of the add caller icon, the conference call with the first and second parties is suspended and a contact list is displayed (e.g., UI 3000O, FIG. 13O).

An outgoing phone call is initiated to a third party using a phone number from an entry in the contact list or a phone number input by a user (e.g., using dial pad 2902, FIG. 29).

Upon detecting an acceptance of the outgoing phone call, a phone call user interface is displayed (e.g., UI 3000M, FIG. 13M, where (987) 054-3210 now corresponds to an outbound call rather than an inbound call) that includes an eighth informational item associated with the suspended conference call (e.g., 3068), a ninth informational item associated with the outgoing phone call between the user and the third party (e.g., 3066), and a merge call icon (e.g., 3038).

Upon detecting a user selection of the merge call icon, (1) the outgoing phone call between the user and the third party and the suspended conference call are merged into a conference call between the user, the first party, the second party, and the third party; and (2) the phone call user interface is replaced with a conference call user interface (e.g., UI 3000G, FIG. 13G).

Thus, as explained above, transparent and intuitive user interfaces for managing conference calls on a portable multifunction dev ice with a touch screen display are provided. The disclosed user interfaces greatly simplify such tasks as adding a new party to a conference call, removing an existing party from a conference call, temporarily converting a conference call into a private phone call with one of the existing parties, and returning to a conference call from a private phone call.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display device;
one or more processors; and
memory storing one or more programs, wherein the one or more programs are stored in the memory and configured to be executed by the one or more processors, the one or more programs including instructions for:
while displaying, via the display device, a first user interface corresponding to an active phone call between a user associated with the electronic device and a first party, receiving an incoming call from a second party;
in response to receiving the incoming call from the second party, displaying, via the display device, a second user interface corresponding to the incoming call, wherein the second user interface concurrently displays:
a first selectable option for answering the incoming call from the second party and suspending the active phone call with the first party; and
a second selectable option for answering the incoming call from the second party and ending the active phone call with the first party;
while displaying the second user interface corresponding to the incoming call, detecting user input; and
in response to detecting the user input:
in accordance with a determination that the user input corresponds to selection of the first selectable option, displaying a third user interface corresponding to an active call with the second party and including a selectable affordance for performing an operation associated with the suspended call with the first party; and
in accordance with a determination that the user input corresponds to selection of the second selectable option, displaying a fourth user interface corresponding to the active call with the second party without including the selectable affordance for performing the operation associated with the suspended call with the first party.

2. The electronic device of claim 1, wherein the second user interface corresponding to the incoming call includes a third selectable option for ignoring the incoming call from the second party, and wherein the one or more programs further include instructions for:
in response to detecting the user input:
in accordance with a determination that the user input corresponds to selection of the third selectable option:
ceasing display of the second user interface corresponding to the incoming call; and
displaying the first user interface corresponding to the active phone call between the user associated with the electronic device and the first party.

3. The electronic device of claim 2, wherein the one or more programs further include instructions for:
in response to detecting the user input:
in accordance with a determination that the user input corresponds to selection of the third selectable option:
sending the incoming call from the second party to voice mail.

4. The electronic device of claim 2, wherein the one or more programs further include instructions for:
in response to detecting the user input:
in accordance with a determination that the user input corresponds to selection of the third selectable option:
ignoring the incoming call from the second party; and
continuing the active phone call between the user associated with the electronic device and the first party.

5. The electronic device of claim 1, wherein the second user interface includes a visual indication of information associated with the second party.

6. The electronic device of claim 1, wherein the second user interface includes:
in accordance with a determination that the second party is a known caller, a visual indication of an identifier of the second party.

7. The electronic device of claim 1, wherein the third user interface includes a swap call icon, that when selected via user input, causes the active call between the user associated with the electronic device and the second party to be suspended and the suspended call between the user associated with the electronic device and the first party to be active.

8. The electronic device of claim 1, wherein the third user interface includes a merge call icon, that when selected via user input, causes the active call between the user associated with the electronic device and the second party to be merged with the suspended call between the user associated with the electronic device and the first party.

9. A non-transitory computer readable storage medium storing one or more programs configured to be executed by one or more processors of an electronic device including a display device, the one or more programs including instructions for:
while displaying, via the display device, a first user interface corresponding to an active phone call between a user associated with the electronic device and a first party, receiving an incoming call from a second party;
in response to receiving the incoming call from the second party, displaying, via the display device, a second user interface corresponding to the incoming call, wherein the second user interface concurrently displays:
a first selectable option for answering the incoming call from the second party and suspending the active phone call with the first party; and
a second selectable option for answering the incoming call from the second party and ending the active phone call with the first party;
while displaying the second user interface corresponding to the incoming call, detecting user input; and
in response to detecting the user input:
in accordance with a determination that the user input corresponds to selection of the first selectable option, displaying a third user interface corresponding to an active call with the second party and including a selectable affordance for performing an operation associated with the suspended call with the first party; and
in accordance with a determination that the user input corresponds to selection of the second selectable option, displaying a fourth user interface corresponding to the active call with the second party without including the selectable affordance for performing the operation associated with the suspended call with the first party.

10. The non-transitory computer readable storage medium of claim 9, wherein the second user interface corresponding to the incoming call includes a third selectable option for ignoring the incoming call from the second party, and wherein the one or more programs further include instructions for:

in response to detecting the user input:
in accordance with a determination that the user input corresponds to selection of the third selectable option:
ceasing display of the second user interface corresponding to the incoming call; and
displaying the first user interface corresponding to the active phone call between the user associated with the electronic device and the first party.

11. The non-transitory computer readable storage medium of claim 10, wherein the one or more programs further include instructions for:

in response to detecting the user input:
in accordance with a determination that the user input corresponds to selection of the third selectable option:
sending the incoming call from the second party to voice mail.

12. The non-transitory computer readable storage medium of claim 10, wherein the one or more programs further include instructions for:

in response to detecting the user input:
in accordance with a determination that the user input corresponds to selection of the third selectable option:
ignoring the incoming call from the second party; and
continuing the active phone call between the user associated with the electronic device and the first party.

13. The non-transitory computer readable storage medium of claim 9, wherein the second user interface includes a visual indication of information associated with the second party.

14. The non-transitory computer readable storage medium of claim 9, wherein the second user interface includes:
in accordance with a determination that the second party is a known caller, a visual indication of an identifier of the second party.

15. The non-transitory computer readable storage medium of claim 9, wherein the third user interface includes a swap call icon, that when selected via user input, causes the active call between the user associated with the electronic device and the second party to be suspended and the suspended call between the user associated with the electronic device and the first party to be active.

16. The non-transitory computer readable storage medium of claim 9, wherein the third user interface includes a merge call icon, that when selected via user input, causes the active call between the user associated with the electronic device and the second party to be merged with the suspended call between the user associated with the electronic device and the first party.

17. A method, comprising:
at an electronic device with a display device:
while displaying, via the display device, a first user interface corresponding to an active phone call between a user associated with the electronic device and a first party, receiving an incoming call from a second party;
in response to receiving the incoming call from the second party, displaying, via the display device, a second user interface corresponding to the incoming call, wherein the second user interface concurrently displays:
a first selectable option for answering the incoming call from the second party and suspending the active phone call with the first party; and
a second selectable option for answering the incoming call from the second party and ending the active phone call with the first party;
while displaying the second user interface corresponding to the incoming call, detecting user input; and
in response to detecting the user input:
in accordance with a determination that the user input corresponds to selection of the first selectable option, displaying a third user interface corresponding to an active call with the second party and including a selectable affordance for performing an operation associated with the suspended call with the first party; and
in accordance with a determination that the user input corresponds to selection of the second selectable option, displaying a fourth user interface corresponding to the active call with the second party without including the selectable affordance for performing the operation associated with the suspended call with the first party.

18. The method of claim 17, wherein the second user interface corresponding to the incoming call includes a third selectable option for ignoring the incoming call from the second party, and wherein the method further comprises:

in response to detecting the user input:
in accordance with a determination that the user input corresponds to selection of the third selectable option:
ceasing display of the second user interface corresponding to the incoming call; and
displaying the first user interface corresponding to the active phone call between the user associated with the electronic device and the first party.

19. The method of claim 18, further comprising:
in response to detecting the user input:
in accordance with a determination that the user input corresponds to selection of the third selectable option:
sending the incoming call from the second party to voice mail.

20. The method of claim 18, further comprising:
in response to detecting the user input:
in accordance with a determination that the user input corresponds to selection of the third selectable option:
ignoring the incoming call from the second party; and
continuing the active phone call between the user associated with the electronic device and the first party.

21. The method of claim 17, wherein the second user interface includes a visual indication of information associated with the second party.

22. The method of claim 17, wherein the second user interface includes:
in accordance with a determination that the second party is a known caller, a visual indication of an identifier of the second party.

23. The method of claim 17, wherein the third user interface includes a swap call icon, that when selected via user input, causes the active call between the user associated with the electronic device and the second party to be suspended and the suspended call between the user associated with the electronic device and the first party to be active.

24. The method of claim 17, wherein the third user interface includes a merge call icon, that when selected via user input, causes the active call between the user associated with the electronic device and the second party to be merged with the suspended call between the user associated with the electronic device and the first party.

* * * * *

UNITED STATES PATENT AND TRADEMARK OFFICE
CERTIFICATE OF CORRECTION

PATENT NO. : 11,405,507 B2  
APPLICATION NO. : 17/306236  
DATED : August 2, 2022  
INVENTOR(S) : Scott Forstall et al.

Page 1 of 1

It is certified that error appears in the above-identified patent and that said Letters Patent is hereby corrected as shown below:

In the Specification

In Column 1, Line 28: Delete "Jan. 7, 2007," and insert -- Dec. 19, 2007, --.

Signed and Sealed this
Twenty-fourth Day of October, 2023

Katherine Kelly Vidal
*Director of the United States Patent and Trademark Office*